(12) United States Patent
Nix

(10) Patent No.: US 10,648,458 B2
(45) Date of Patent: May 12, 2020

(54) DOWNDRAFT AND UPDRAFT TORNADO WIND CHIMNEY

(71) Applicant: Martin E Nix, Seattle, WA (US)

(72) Inventor: Martin E Nix, Seattle, WA (US)

( * ) Notice: Subject to any disclaimer, the term of this patent is extended or adjusted under 35 U.S.C. 154(b) by 527 days.

(21) Appl. No.: 14/999,790

(22) Filed: Jun. 27, 2016

(65) Prior Publication Data

US 2017/0370351 A1    Dec. 28, 2017

(51) Int. Cl.
*F03G 6/04*          (2006.01)

(52) U.S. Cl.
CPC .............. *F03G 6/04* (2013.01); *Y02E 10/465* (2013.01)

(58) Field of Classification Search
CPC .................................. F03G 6/04; Y02E 10/46
See application file for complete search history.

(56) References Cited

U.S. PATENT DOCUMENTS

| | | | |
|---|---|---|---|
| 4,070,131 A | 1/1978 | Yen | |
| 4,452,562 A | 7/1984 | Hsu | |
| 5,096,467 A | 3/1992 | Matsui | |
| 5,899,071 A * | 5/1999 | Stone | F02G 5/00 60/641.8 |
| 6,016,015 A | 1/2000 | Willard, Jr. | |
| 6,249,059 B1 | 6/2001 | Hosoda | |
| 6,943,461 B2 | 9/2005 | Kaploun | |
| 6,962,478 B2 | 11/2005 | Tsipov | |
| 7,086,823 B2 | 8/2006 | Michaud | |
| 7,582,982 B1 | 9/2009 | Deal | |
| 7,735,483 B2 | 6/2010 | Papageorgion | |
| 7,757,490 B2 | 7/2010 | Kenessey | |
| 7,771,158 B2 | 8/2010 | Grassi | |
| 7,938,618 B2 | 5/2011 | Michaud | |
| 8,708,640 B2 | 4/2014 | Power | |
| 8,931,276 B2 * | 1/2015 | Kim | F24F 5/0046 60/641.8 |
| 9,062,896 B2 | 6/2015 | Nix | |
| 9,103,328 B1 * | 8/2015 | Kilgore | F03G 6/065 |
| 9,140,236 B2 | 9/2015 | Iskrenovic | |
| 9,145,872 B2 * | 9/2015 | Cotton | F03G 6/065 |
| 9,279,415 B1 * | 3/2016 | Huber | F24J 2/4638 |

(Continued)

FOREIGN PATENT DOCUMENTS

CN            104389743        3/2015

*Primary Examiner* — Michael C Zarroli

(57) ABSTRACT

A downdraft-tornado-wind-chimney and a updraft-tornado-wind-chimney create the compressed-and-high-velocity-air for a rotating-turbine. A photovoltaic-powered-blower and a high-temperature-solar-collectors create the compressed-and-high-velocity-air. A downdraft-tornado-wind-chimney inject the compressed-and-high-velocity-air into a photovoltaic-powered-blower, a high-temperature-solar-collectors and a rotating-turbine. A updraft-tornado-wind-chimney extract the compressed-and-high-velocity-air from a photovoltaic-powered-blower, a high-temperature-solar-collectors and a rotating-turbine. The combination of the updraft-tornado-wind-chimney, a downdraft-tornado-wind-chimney, a photovoltaic-powered-blower, and a high-temperature-solar-collectors drive a rotating-turbine.

5 Claims, 17 Drawing Sheets

(56) References Cited

U.S. PATENT DOCUMENTS

| | | | | |
|---|---|---|---|---|
| 2005/0150225 A1* | 7/2005 | Gwiazda | ............... | F03D 1/04 60/641.1 |
| 2010/0264656 A1* | 10/2010 | Flood | ............... | B64G 1/44 290/52 |
| 2014/0298807 A1* | 10/2014 | Villarrubia Ruiz | ....... | F03G 6/04 60/641.13 |
| 2016/0047360 A1* | 2/2016 | Fex, Jr. | ............... | F03D 1/04 415/1 |
| 2016/0123331 A1 | 5/2016 | Nix | | |

\* cited by examiner

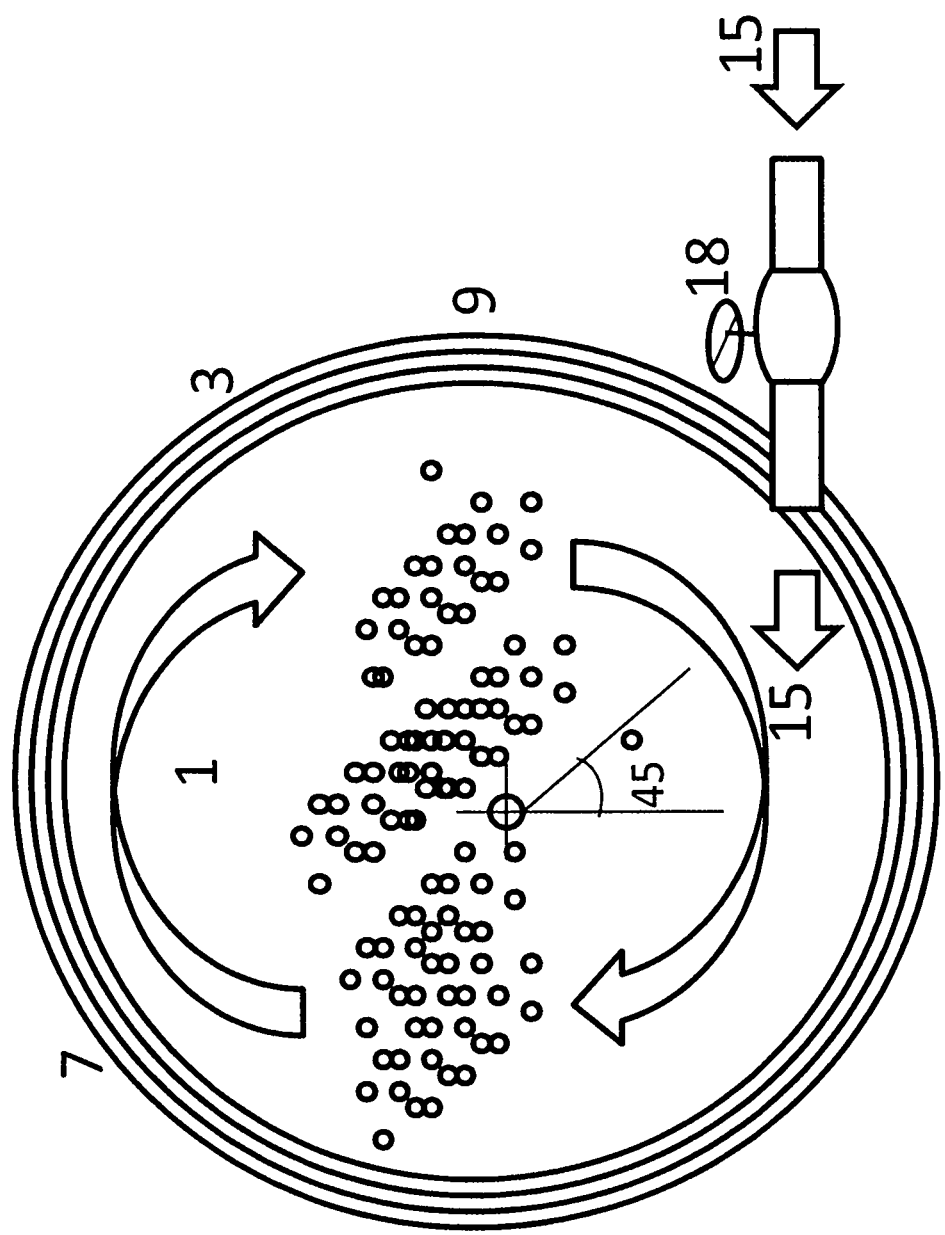

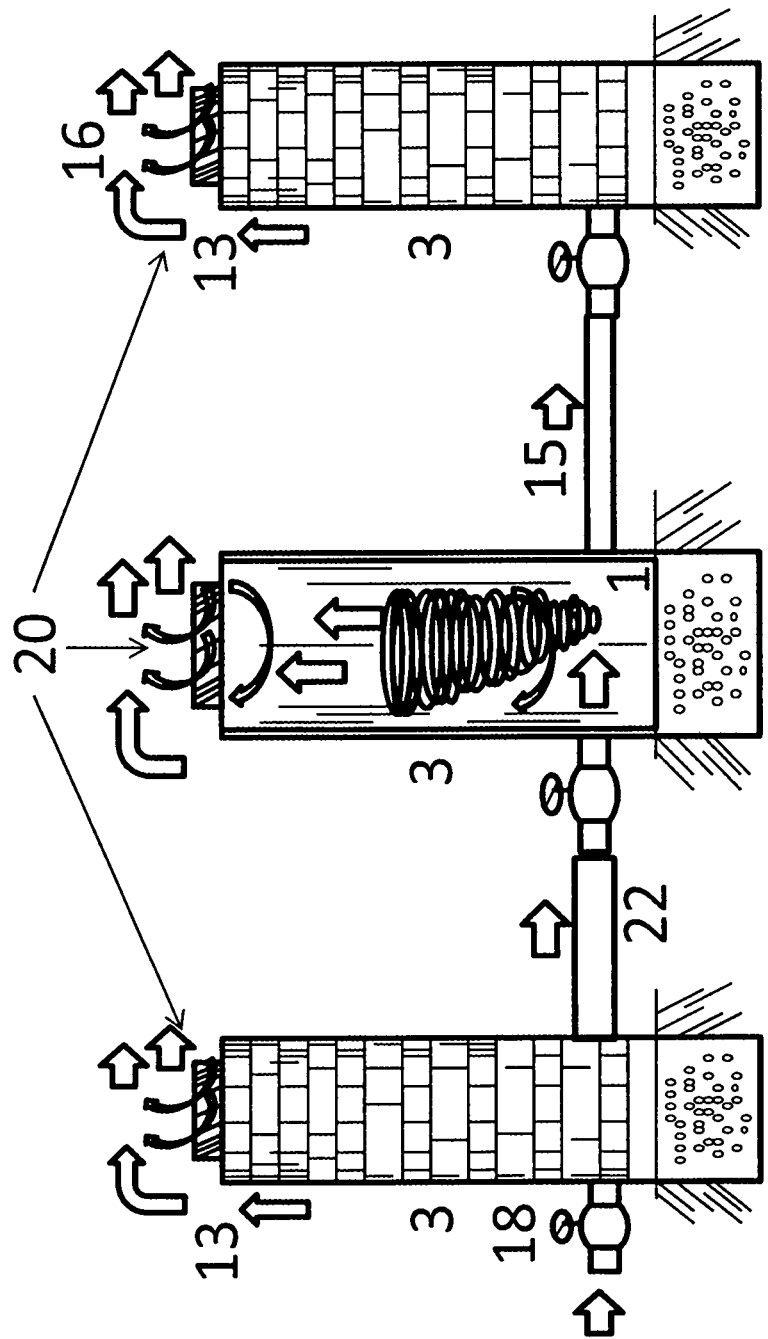

DOWNDRAFT AND UPDRAFT TORNADO WIND CHIMNEY

FIELD OF INVENTION

A tornado is created by a downdraft-tornado-wind-chimney and a updraft-tornado-wind-chimney to drive a rotating-turbine using a photovoltaic-powered-blower and a high-temperature-solar-collectors.

PRIOR ART

The use of wind chimneys to create the high-velocity-and-compressed-air is an ancient technology, perfected by ancient Arabs for cooling. Wind chimneys are state of the art for rotating-turbines.

Yen (U.S. Pat. No. 4,070,131, issued Jan. 24, 1978) Wind is admitted tangentially into a vertical structure to create a vortex. The low pressures draws ram air into the bottom to drive a horizontal turbine.

Hsu (U.S. Pat. No. 4,452,562, issued Jul. 5, 1984) A tornado within a wind chimney is created by a porous wall to drive a turbine. Air exits out the top of the wind chimney, creating an updraft.

Matsui (U.S. Pat. No. 5,096,467, issued Mar. 17, 1992) Illustrated is the use of a parallel pipes to create an artificial tornado.

Willard, Jr. (U.S. Pat. No. 6,016,015, issued Jan. 18, 2000) A opening at the bottom of a tower create an updraft to drive a propeller. A plurality of mirrors heat a transparent outer shell using the sun's energy.

Hosoda (U.S. Pat. No. 6,249,059, issued Jun. 19, 2001). A wind guide directs the wind to a vertical shaft.

Tsipov (U.S. Pat. No. 6,962,478, issued Nov. 8, 2005) A vertical axis wind turbine utilizes vanes to capture wind to spin a turbine.

Kaploun (U.S. Pat. No. 6,943,461, issued Sep. 13, 2005) Steam enhances a wind vortex tower during insufficient wind periods. A diffuser is utilized for exhaust of the wind.

Michaud (U.S. Pat. No. 7,086,823, issued Aug. 8, 2006) A vortex is created by admitting air tangentially. Heat from fuel is utilized within a circular wall.

Deal (U.S. Pat. No. 7,582,982, issued Sep. 1, 2009) Vanes are used to spin a magnetized rotor from wind energy.

Papageorgion (U.S. Pat. No. 7,735,483, issued Jun. 15, 2010) Shown are a system of cylindrical balloon rings for an updraft solar powered chimney, floating on water. The decline allows the solar powered chimney to bend in the wind.

Michaud (U.S. Pat. No. 7,938,615, issued May 10, 2011) Waste industrial heat, or warm seawater, is used to create a vortex. Air enters via an opening in the center of the floor.

Kenessey (U.S. Pat. No. 7,757,490, issued Jul. 20, 2010) Shown is a method of generating electrical power utilizing waste heat and wind. A helix shaped tower creates an updraft of air.

Grassi (U.S. Pat. No. 7,771,158, issued Aug. 10, 2010) A airfoil shaped tower use the pressure drop of an airfoil to turn a turbine. Adjacent towers augment. Bleeder vents, inlets and diffusers are used to adjust to the movement of the wind.

Power (U.S. Pat. No. 8.708,640, issued Apr. 29, 2014) A system of converging nozzles into a circular air chamber create a vacuum.

Nix (U.S. Pat. No. 9,062,896, issued Jun. 23, 2015) A rotating air compressor heats hot air via a solar smelter, thus driving a helix coil in a updraft wind chimney. The invented device has the turbine external to the wind chimney.

lskrenovic (U.S. Pat. No. 9140236, issued Sep. 22, 2015) A plurality of slats open on the windward side and close on the leeward side, so as to rotate a rotor.

Nix (U.S. Pat. Application No. 20160123331, Published May 5, 2016) Developed is a flywheel to overcome the variability of wind and solar energy. Unique is the use of a downdraft wind shroud, and a wind chimney for a updraft. Reference: FIGS. 5B and 8.

Foreign Patent (CN 104,389,743, issued Mar. 4, 2015) A greenhouse and a artificial heat source are used to create a tornado in a wind chimney. The invented device utilizes high temperature solar collectors.

A review of the art, illustrates the use of wind chimneys for driving a rotating-turbine is technically feasible. The enclosed invented device improves upon this art. New and novel is the creation of a combination of a downdraft-tornado-wind-chimney and a updraft-tornado-wind-chimney. The combination creates the compressed-and-high-velocity-air and a vacuum. The compressed-and-high-velocity-air from a downdraft-tornado-wind-chimney drives a rotating-turbine. A vacuum created by a updraft-tornado-wind-chimney also drives a rotating-turbine. New and novel is the use of a downdraft-tornado-wind-chimney combined with a updraft-tornado-wind-chimney to amplify the compressed-and-high-velocity-air created by a photovoltaic-powered-blower. New and novel is the use of a high-temperature-solar-collectors to heat and expand air from a downdraft-tornado-wind-chimney to drive a rotating-turbine, combined with a vacuum created by a updraft-tornado-wind-chimney. New and novel is the use of a plurality of a updraft-tornado-wind-chimney to create a vacuum for a rotating-turbine. New and novel is use of a plurality of a downdraft-tornado-wind-chimney to drive a rotating-turbine. New and novel is the use of a circular-vane-ring to create a downdraft tornado in a downdraft-tornado-wind-chimney. New and novel is the use of a circular-vane-array to create a updraft in a updraft-tornado-wind-chimney. A horizontal-lid entrap the tornado in a circular-vertical-tube. A extraction-valve and a insertion-valve remove and insert the compressed-and-high-velocity-air from and to a tornado.

SUMMARY OF INVENTION

A tornado is created by a downdraft-tornado-wind-chimney and a updraft-tornado-wind-chimney to drive a rotating-turbine using a photovoltaic-powered-blower and a high-temperature-solar-collectors.

A downdraft-tornado-wind-chimney is comprised of a circular-vertical-tube. A circular-vertical-tube is comprised of a upper-rim and comprised of a lower-rim. Adjacent, vertical and attached to a upper-rim is a circular-vane-ring. A horizontal-lid is adjacent, perpendicular and attached to a circular-vane-ring. A horizontal-lid encapsulate a tornado in a downdraft-tornado-wind-chimney.

A circular-vane-ring is comprised of a individual-vanes. A horizontal-lid is adjacent, perpendicular and attached to a individual-vanes. A individual-vanes is angled so as to capture the blowing-wind. A individual-vanes is angled so as to create a tornado. A tornado is centrally located to a circular-vane-ring.

A tornado is centrally located in a circular-vertical-tube and also centrally located in a circular-vane-ring. A tornado is thus entrapped by a horizontal-lid. The combination of a circular-vane-ring, a horizontal-lid, and a circular-verticaltube create a tornado from the blowing wind. A tornado captures the energy from the blowing-wind.

A tornado forces the blowing-wind from a upper-rim to a lower-rim. Located at the lower-rim is a extraction-valve. A extraction-valve is located adjacent, perpendicular and attached to a circular-vertical-tube. A extraction-valve is offset 45 degrees from the center of a circular-vertical-tube. A extraction-valve is located adjacent, perpendicular and attached to a lower-rim. A extraction-valve is angled so as to extract the blowing-wind from a tornado.

A extraction-valve regulates the amount of the blowing-wind. Thus, a extraction-valve creates the compressed-and-high-velocity-air. Thus, a circular-vertical-tube create the compressed-and-high-velocity-air. Thus, a circular-vane-ring create the compressed-and high-velocity-air. Thus, the individual-vanes create the compressed-and-high-velocity-air.

The net result is a downdraft-tornado-wind-chimney create the compressed-and-high-velocity-air. A downdraft-tornado-wind-chimney is comprised of a circular-vertical-tube, a circular-vane-ring, a individual-vanes, and a extraction-valve, thus capturing the blowing-wind to create the compressed-and-high-velocity-air from a tornado.

A updraft-tornado-wind-chimney is comprised of a circular-vertical-tube. A circular-vertical tube is comprised of a upper-rim and comprised of a lower-rim. A circular-vertical-tube is adjacent, vertical, and attached to a circular-ring-array. A circular-vane-array is adjacent, horizontal and attached to a horizontal-lid. A circular-vane-array is centrally located to a horizontal-lid. A circular-vane-array contains a radial-individual-vanes.

A horizontal-lid, a vertical-circular-tube, a circular-vane-array, a radial-individual-vanes encapsulate a tornado. A horizontal-lid create a tornado. A circular-vertical-tube create a tornado. A circular-vane-array create a tornado. The radial-individual-vanes is angled so as to create a tornado.

A insertion-valve is located adjacent, perpendicular and attached to a lower-rim. A insertion-valve is offset by 45 degrees from the center of a circular-vertical-tube. A insertion-valve injects the compressed-and-high-velocity-air. A insertion-valve injects the compressed-and-high-velocity-air into a circular-vertical-tube. A insertion-valve injects the compressed-and-high-velocity-air into a circular-vane-array. A insertion-valve injects the compressed-and-high-velocity-air into a radial-individual-vanes. A insertion-valve is angled so as to create a tornado. A updraft-tornado-wind-chimney is comprised of a vertical-circular-tube, a horizontal-lid, a insertion-valve, a circular-vane-array, a radial-individual-vanes, and a tornado. A updraft-tornado-wind-chimney create the compressed-and-high-velocity-air from the blowing-wind.

A photovoltaic-powered-blower, a high-temperature-solar-collectors and a rotating-turbine capture the compressed-and-high-velocity-air from a downdraft-tornado-wind-chimney. A photovoltaic-powered-blower, a high-temperature-solar-collectors, and a rotating-turbine inject the compressed-and-high-velocity-air into a updraft-tornado-wind-chimney. The net result is a rotating-turbine drives a generator, water pump, air compressor or other rotating machinery. The upward movement of the compressed-and-high-velocity air create a vacuum. Hot air rises. The blowing-wind across a upper rim of a updraft-tornado-wind-turbine and a circular-vane-array also create a vacuum.

A photovoltaic-powered-blower create the compressed-and-high-velocity-air. A photovoltaic-powered-blower inject the compressed-and-high-velocity-air into a high-temperature-solar-collectors. A photovoltaic-powered-blower inject the compressed-and-high-velocity-air into a rotating-turbine. The high-temperature-solar-collectors extract the compressed-and-high-velocity air from a photovoltaic-powered-blower. The photovoltaic-powered-blower can be supplemented with batteries, or be tied to the utility grid so as to provide compressed-and-high-velocity air as needed.

A high-temperature-solar-collectors inject the compressed-and-high-velocity air into a rotating-turbine. A rotating-turbine extract the compressed-and-high-velocity-air from a photovoltaic-powered-blower. A rotating-turbine extract the compressed-and-high-velocity air from a high-temperature-solar-collectors. A high-temperature-solar-collectors create the compressed-and-high-velocity-air from the expansion of cooler air to hotter air. A photovoltaic-powered-blower, a high-temperature-solar-collectors and a rotating-turbine assembly extract the compressed-and-high-velocity-air from a downdraft-tornado-wind-chimney. A photovoltaic-powered-blower, a high-temperature-solar-collectors and a rotating-turbine inject the compressed-and-high-velocity-air into a updraft-tornado-wind-chimney. A downdraft-tornado-wind-chimney create pressure, while a updraft-tornado-wind-chimney create a vacuum. The blowing-wind across a upper-rim of a updraft-tornado-wind-chimney create a vacuum.

The net result is a photovoltaic-powered-blower, a high-temperature-solar-collectors and a rotating-turbine are pushed by a downdraft-tornado-window-chimney. The net result is a photovoltaic-powered-blower, a high-temperature-solar-collectors and a rotating-turbine are pulled by a updraft-tornado-window-chimney. It is the expansion of hot air that causes a naturally occurring tornado, which a updraft-tornado-wind-chimney mimics. A circular-vane-array can have a shroud added to protect during sand storms. Ambient air can be extracted so as to prevent dust from sand storms. Check valves and other controls may be added as needed. Pipe diameter can be adjusted as needed. Height of pipes can adjusted so as to take advantage of the siphon affect of hot air. Other controls can be added as needed. Variations of design can be done. A high-temperature-solar-collectors can be built without a photovoltaic-powered-blower. The photovoltaic-powered-blower can be built without a high-temperature-solar-collectors. The variation of design can be without a photovoltaic-powered-blower, and a high-temperature-solar-collectors, with only a rotating-turbine. Regulation valves and flywheels may be added to stabilize the air flow. Bird screens can be added for bird protection. The tornado acts like a giant flywheel, thus stabilizing the pressure of the compressed-and-high-velocity-air. Tornados in the Northern Hemisphere rotate clockwise, while tornados in the Southern Hemisphere rotate counter clockwise.

A plurality of a updraft-tornado-wind-chimney can be constructed so as to enhance the compressed-and-high-velocity-air. A plurality of a downdraft-tornado-wind-chimney can be constructed so as to enhance the compressed-and-high-velocity-air. A photovoltaic-powered-blower extracts the compressed-and-high-velocity-air from a plurality of a downdraft-tornado-wind-chimney. A photovoltaic-powered-blower inject the compressed-and-high-velocity-air into a plurality of a updraft-tornado-wind-chimney. A plurality of downdraft-tornado-wind-chimney inject the compressed-and-high-velocity-air into a high-temperature-solar-collectors. A high-temperature-solar-collectors inject the compressed-and-high-velocity-air into a plurality of a updraft-tornado-wind-chimney. A downdraft-tornado-wind-chimney can be parallel or in series. A updraft-tornadowind-chimney can be parallel or in series. The plurality of a downdraft-tornado-wind-chimney and a updraft-tornado-wind-chimney are joined by a pipe network. A plurality of a downdraft-tornado-wind-chimney inject the compressed-and-high-velocity-air into a rotating-turbine. A rotating-turbine injects the compressed-and-high-velocity-air into a plurality of updraft-tornado-wind-chimney.

A description of the figures follows. FIG. 1A shows a external frontal view of a downdraft-tornado-wind-chimney. Components comprise of a upper rim, a lower rim, a horizontal lid, a circular-vane-ring, a individual-vanes is angled so as to capture the blowing wind. A circular-vertical-tube completes a downdraft-tornado-wind-chimney. A extraction-valve captures the compressed-and-high-velocity-air.

FIG. 1B shows the frontal internal functional view of a downdraft-tornado-wind-chimney. Components comprise of a upper rim, a lower rim, a horizontal lid, a circular-vane-ring, a tornado, and a individual-vanes is angled so as to capture the blowing wind. A circular-vertical-tube completes a downdraft-tornado-wind-chimney. A extraction-valve captures the compressed-and-high-velocity-air.

FIG. 1C shows a overhead internal functional view of a downdraft-tornado-wind-chimney. Components comprise of a individual-vanes, a circular-vertical-tube, a tornado, a circular-vane-ring, and a upper-rim. The blowing-wind creates the compressed-and-high-velocity-air.

FIG. 1D shows a overhead internal functional view of a downdraft-tornado-wind-chimney. Components comprise of a tornado, a lower-rim, a circular-vertical-tube, and a extraction-valve, to create the compressed-and-high velocity-air. The extraction-valve is angled 45 degrees from center of a circular-vertical-tube so as to create a tornado. FIGS. 1A, 1B, 1C, 1D shows a complete system where the blowing-wind enters a circular-vane-ring, located adjacent and attached to a upper-rim of a circular-vertical-tube. A circular-vane-ring is comprised of a individual-vanes angled so as to create a tornado. The net result is a tornado. A extraction valve is so located 45 degrees from the center of a circular-vertical-tube so as to extract the compressed-and-high-velocity-air of a tornado.

FIG. 2A shows a external frontal view of a updraft-tornado-wind-chimney. Components comprise of a upper rim, a lower rim, a horizontal lid, a circular-vane-array, a radial-individual-vanes is angled so as to capture the blowing wind. A circular-vertical-tube completes a updraft-tornado-wind-chimney. A insertion-valve inserts the compressed-and-high-velocity-air.

FIG. 2B shows the frontal functional view of a updraft-tornado-wind-chimney. Components comprise of a upper rim, a lower rim, a horizontal lid, a circular-vane-array, a tornado, a radial-individual-vanes is angled so as to capture the blowing wind. A circular-vertical-tube completes a updraft-tornado-wind-chimney. A insertion-valve inserts the compressed-and-high-velocity-air. The expansion of hot air create a vacuum.

FIG. 2C shows a overhead external functional view of a updraft-tornado-wind-chimney. Components comprise of a radial-individual-vanes, a circular-vertical-tube, a tornado, a circular-vane-array, and a upper-rim. The blowing-wind creates the compressed-and-high-velocity-air.

FIG. 2D shows a overhead internal functional view of a updraft-tornado-wind-chimney. Components comprise of a tornado, a lower-rim, a circular-vertical-tube, and a insertion-valve to create the compressed-and-high velocity-air. FIGS. 1A, 1B, 1C, 1D shows a complete system where the compressed-and-high-velocity-air enters a updraft-tornado-wind-chimney. The insertion-valve is angled 45 degrees so as to create a rotating tornado. A circular-vane-array, is located adjacent and attached to a upper-rim of a circular-vertical-tube. A circular-vane-array is comprised of a radial-individual-vanes angled so as to create a tornado. As the compressed-and-high-velocity-air expands inside a circular-vertical-tube, a tornado is created. Hot air rises.

FIG. 3 illustrates a downdraft-tornado-wind-chimney and a updraft-tornado-wind-chimney. A downdraft-tornado-wind-chimney create the compressed-and-high-velocity-air for a rotating-turbine. The updraft-tornado-wind-chimney create a vacuum. Shown are the components of a tornado, a extraction-valve, a insertion-valve, a vacuum, a circular-vane-ring, and a circular-vane-array. The net result is a downdraft-tornado-wind-chimney and a updraft-tornado-wind-chimney push and pull on a rotating-turbine from the blowing-wind.

FIG. 4 illustrates a downdraft-tornado-wind-chimney and a updraft-tornado-wind-chimney. A downdraft-tornado-wind-chimney create the compressed-and-high-velocity-air for a rotating-turbine. The updraft-tornado-wind-chimney create a vacuum. Shown are the components of a tornado, a extraction-valve, a insertion-valve, a vacuum, a circular-vane-ring, and a circular-vane-array. The net result is a downdraft-tornado-wind-chimney and a updraft-tornado-wind-chimney push and pull on a rotating-turbine from the blowing-wind. There is the addition of a photovoltaic-powered-blower. The photovoltaic-powered-blower extract the compressed-and-high-velocity-air from the extraction-valve and further compresses the compressed-and-high-velocity-air. A pipe network joins a photovoltaic-powered-blower with a rotating-turbine. The net result is solar energy adds additional power to a rotating-turbine.

FIG. 5 illustrates a downdraft-tornado-wind-chimney and a updraft-tornado-wind-chimney. A downdraft-tornado-wind-chimney create the compressed-and-high-velocity-air for a high-temperature-solar-collectors. Shown are the components of a tornado, a extraction-valve, a insertion-valve, a circular-vane-ring, and a circular-vane-array. The net result is a downdraft-tornado-wind-chimney and a updraft-tornado-wind-chimney push and pull on a rotating-turbine from the blowing-wind. A high-temperature-solar-collectors extract compressed-and-high-velocity-air from a extraction-valve and further compresses the compressed-and-high-velocity-air. The net result is solar energy adds additional power to a rotating-turbine.

FIG. 6 illustrates a downdraft-tornado-wind-chimney and a updraft-tornado-wind-chimney. A downdraft-tornado-wind-chimney create the compressed-and-high-velocity-air for a high-temperature-solar-collectors and a photovoltaic-powered-blower. Shown are the components of a tornado, a extraction-valve, a insertion-valve, a circular-vane-ring, and a circular-vane-array. The net result is a downdraft-tornado-wind-chimney and a updraft-tornado-wind-chimney push and pull on a rotating-turbine from the blowing-wind. There is the addition of a high-temperature-solar-collectors and a photovoltaic-powered-blower. A high-temperature-solar-collectors and photovoltaic-powered-blower extract compressed-and-high-air and further compresses the compressed-and-high-velocity-air. A pipe network join a photovoltaic-powered-blower, a high-temperature-solar-collectors, and a rotating-turbine. The net result is solar energy adds additional power to a rotating-turbine from the blowing-wind.

FIG. 7A shows a frontal functional and external view of a plurality of a downdraft-tornado-wind-chimney. Shown is a circular-vane-ring, a upper-rim, a lower-rim, a circularvertical-tube, a tornado, and a extraction-valve. The net result is to create the compressed-and-high-velocity-air. The plurality of a downdraft-tornado-wind-chimney are joined by a pipe network.

FIG. 7B shows a overhead functional internal view of a plurality of a downdraft-tornado-wind-chimney. Shown is a circular-vane-ring, a individual-vanes, a upper-rim, a circular-vertical-tube, a tornado, and a extraction-valve. The net result is to create the compressed-and-high-velocity-air.

FIG. 8A shows a frontal functional internal and external view of a plurality of a updraft-tornado-wind-chimney. Shown is a circular-vane-array, a circular-vertical-tube, a tornado, and a insertion-valve. The net result is to create the compressed-and-high-velocity-air from the blowing-wind. A plurality of a downdraft-tornado-wind-chimney are join by a pipe network.

FIG. 8B shows a overhead functional internal and external view of a plurality of a updraft-tornado-wind-chimney. Shown is a circular-vane-array, a horizontal-lid, a lower-rim, a circular-vertical-tube, a tornado, and a insertion-valve. A plurality of a updraft-tornado-wind-chimney is joined by a pipe network. The net result is the compressed-and-high-velocity-air. The net result is a vacuum.

FIG. 9 shows a frontal internal and external functional overview of the entire system of a plurality of a downdraft-tornado-wind-chimney combined with a plurality of a updraft-tornado-wind-chimney. A plurality of a downdraft-tornado-wind-chimney and a plurality of a updraft-tornado-wind-chimney create the compressed-and-high-velocity-air from the blowing-wind. The net result is the compressed-and-high-velocity-air is created for a photovoltaic-powered-blower, a high-temperature-solar-collectors and a rotating-turbine. Shown is a tornado, a extraction-valve, a insertion-valve, a downdraft-tornado-wind-chimney, a updraft-tornado-wind-chimney, a circular-vertical-tube, and a pipe network.

DESCRIPTION OF FIGURES

FIG. 2D shows a lower-rim overhead view of a updraft-tornado-wind-chimney. Shown is a internal functional view.

FIG. 8A shows a frontal view of a plurality of a updraft-tornado-wind-chimney. Shown is a external and internal functional view.

DETAILED DESCRIPTION

Figure 1A:
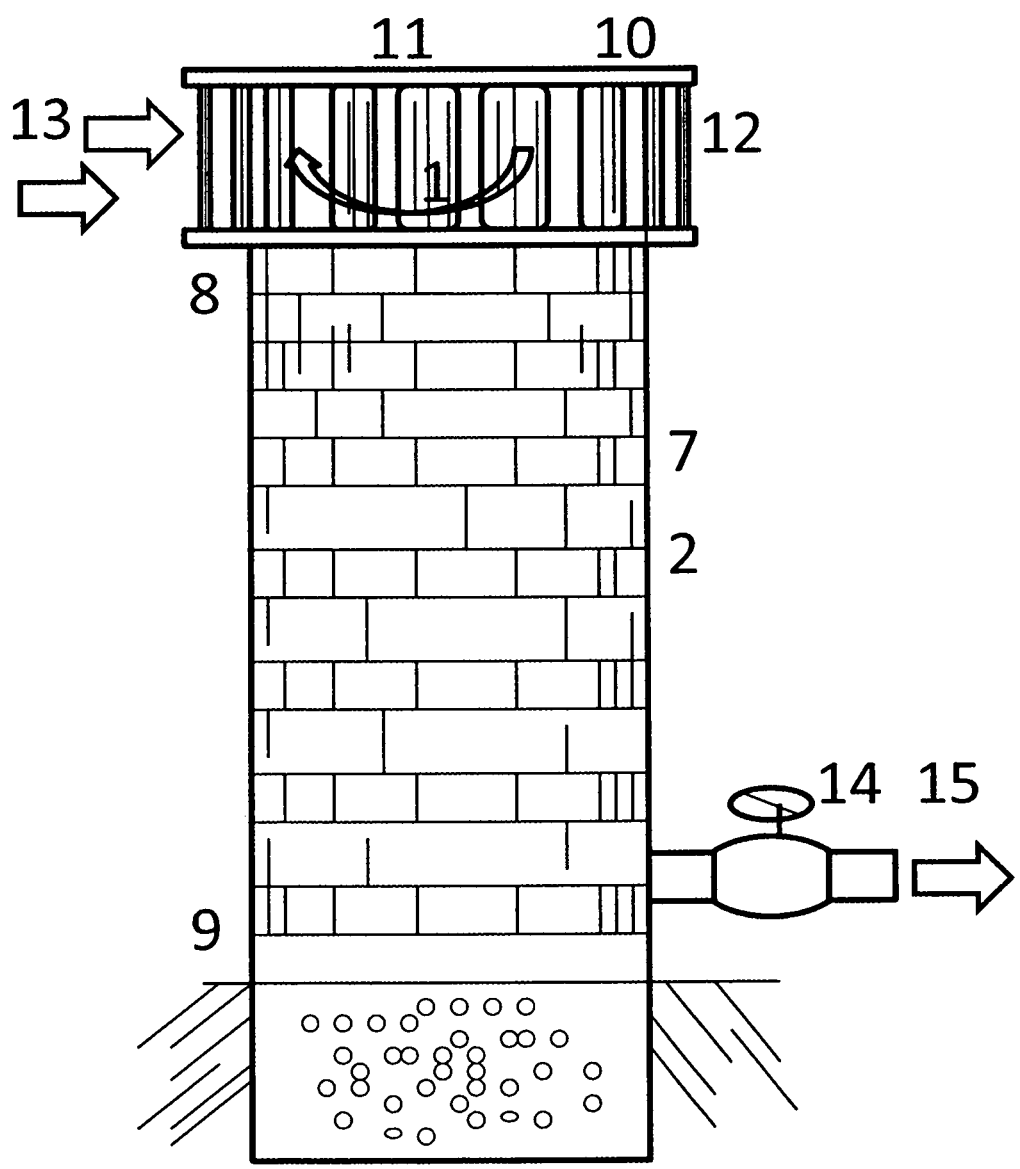
FIG. 1A shows a frontal overview of a downdraft-tornado-wind-chimney. Shown is a external view.

A tornado (1) is created by a downdraft-tornado-wind-chimney (2) and a updraft-tornado-wind-chimney (3) to drive a rotating-turbine (4) using a photovoltaic-powered-blower (5), and a high-temperature-solar-collectors (6).

A downdraft-tornado-wind-chimney (2) is comprised of a circular-vertical-tube (7). A circular-vertical-tube (7) is comprised of a upper-rim (8) and comprised of a lower-rim (9). Adjacent, vertical and attached and to a upper-rim (8) is a circular-vane-ring (10). A horizontal-lid (11) is adjacent, perpendicular and attached to a circular-vane-ring (10). A horizontal-lid (11) encapsulate a tornado (1) in a downdraft-tornado-wind-chimney (2).

A circular-vane-ring (10) is comprised of a individual-vanes (12). A horizontal-lid (11) is adjacent, perpendicular and attached to a individual-vanes (12). A individual-vanes (12) is angled so as to capture the blowing-wind (13). A individual-vanes (12) is angled so as to create a tornado (1). A tornado (1) is centrally located to a circular-vane-ring (10).

A tornado (1) is centrally located in a circular-vertical-tube (7) and centrally located in a circular-vane-ring (10). A tornado (1) is entrapped by a horizontal-lid (11). The combination of a circular-vane-ring (10), a horizontal-lid (11), and a circular-vertical-tube (7) create a tornado (1) from the blowing wind (13). A tornado (1) captures the energy from the blowing-wind (13).

A tornado (1) forces the blowing-wind (13) from a upper-rim (8) to a lower-rim (9). Located at a lower-rim (9) is a extraction-valve (14). A extraction-valve (14) is located adjacent, perpendicular and attached to a circular-vertical-tube (7). A extraction-valve (14) is offset 45 degrees from the center of a circular-vertical-tube (7). A extraction-valve (14) is located adjacent, perpendicular and attached to a lower-rim (9). A extraction-valve (14) is angled so as to extract the blowing-wind (13) from a tornado (1).

A extraction-valve (14) regulates the amount of the compressed-and-high-velocity-air from the blowing-wind (13). Thus, a extraction-valve (14) create the compressed-and-high-velocity-air (15). Thus, a circular-vertical-tube (7) create the compressed-and-high-velocity-air (15). Thus, a circular-vane-ring (10) create the compressed-and -high-velocity-air (15). Thus, the individual-vanes (12) create the compressed-and-high-velocity-air (15).

The net result is a downdraft-tornado-wind-chimney (2) create the compressed-and-high-velocity-air (15). A downdraft-tornado-wind-chimney (2) is comprised of a circular-vertical-tube (7), a circular-vane-ring (10), a individual-vanes (12), and a extraction-valve (14), thus capturing the blowing-wind (13) to create the compressed-and-high-velocity-air (15) for a tornado (1).

A updraft-tornado-wind-chimney (3) is comprised of a circular-vertical-tube (7). A circular-vertical-tube (7) is comprised of a upper-rim (8) and comprised of a lower-rim (9). A horizontal-lid (11) is adjacent, perpendicular and attached to a circular-vertical-tube (7). A circular-vane-array (16) is adjacent, horizontal and attached to a horizontal-lid (11). A circular-vane-array (16) is centrally located to a horizontal-lid (11). A circular-vane-array (16) contains a radial-individual-vanes (17).

A horizontal-lid (11), a vertical-circular-tube (7), a circular-vane-array (16), and a radial-individual-vanes (17) encapsulate a tornado (1). A horizontal-lid (11) create a tornado (1). A circular-vertical-tube (7) create a tornado (1). A circular-vane-array (16) create a tornado (1). A radial-individual-vanes (17) is angled so as to create a tornado (1).

A insertion-valve (18) is located adjacent, perpendicular and attached to a lower-rim (9). A insertion-valve (18) is offset by 45 degrees from the center of a circular-vertical-tube (7). A insertion-valve (18) injects the compressed-and-high-velocity-air (15). A insertion-valve (18) injects the compressed-and-high-velocity-air (15) into a circular-vertical-tube (7). A insertion-valve (18) injects the compressed-and-high-velocity-air (15) into a circular-vane-array (16). A insertion-valve (18) injects the compressed-and-high-velocity-air (15) into a radial-individual-vanes (17). A insertion-valve (18) is angled so as to create a tornado (1). A updraft-tornado-wind-chimney (3) is comprised of a vertical-circular-tube (7), a horizontal-lid (11), a insertion-valve (18), a circular-vane-array (16), a radial-individual-vanes (17), and a tornado (1). A updraft-tornado-wind-chimney (3) create a vacuum (21) from the upward movement of the compressed-and-high-velocity-air (15) from the blowing-wind (13). Hot air rises. The blowing-wind (13) across a upper-rim (8) of a updraft-tornado-wind-chimney (3) and across a circular-vane-array (16) also create a vacuum (21).

A photovoltaic-powered-blower (4), a high-temperature-solar-collector (5) and a rotating-turbine (6) capture the compressed-and-high-velocity-air (15) from a downdraft-tornado-wind-chimney (2). A photovoltaic-powered-blower (4), a high-temperature-solar-collectors (5), and a rotating-turbine (4) inject the compressed-and-high-velocity-air (15) into a updraft-tornado-wind-chimney (3). The net result is a rotating-turbine (4) drives a generator, water pump, air compressor or other rotating machinery.

A photovoltaic-powered-blower (5) create the compressed-and-high-velocity-air (15). A photovoltaic-powered-blower (5) inject the compressed-and-high-velocity-air (15) into a high-temperature-solar-collectors (6). A photovoltaic-powered-blower (5) inject the compressed-and-high-velocity-air (15) into a rotating-turbine (4). A high-temperature-solar-collectors (5) extract the compressed-and-high-velocity air (15) from a photovoltaic-powered-blower (5).

A high-temperature-solar-collectors (5) inject the compressed-and-high-velocity air (15) into a rotating-turbine (4). A rotating-turbine (4) extract the compressed-and-high-velocity-air (15) from a photovoltaic-powered-blower (5). A rotating-turbine (4) extract the compressed-and-high-velocity-air (15) from a high-temperature-solar-collectors (6). A high-temperature-solar-collectors (6) create the compressed-and-high-velocity-air (15) from the expansion of cooler air to hotter air. A photovoltaic-powered-blower (5), a high-temperature-solar-collectors (6) and a rotating-turbine (4) extract the compressed-and-high-velocity-air (15) from a downdraft-tornado-wind-chimney (2). The photovoltaic-powered-blower (5), a high-temperature-solar-collectors (6) and a rotating-turbine (4) inject the compressed-and-high-velocity-air (15) into a updraft-tornado-wind-chimney (3). A downdraft-tornado-wind-chimney (2) create pressure, while a updraft-tornado-wind-chimney (3) create a vacuum (21). The net result is the photovoltaic-powered-blower (5), a high-temperature-solar-collectors (6) and a rotating-turbine (4) is pushed by a downdraft-tornado-window-chimney (3). A pipe (22) network join together the downdraft-tornado-wind-chimney (2), a updraft-tornado-wind-chimney (3), a photovoltaic-powered-blower (5), a high-temperature-solar-collectors (6) and a rotating-turbine (4). The net result is a photovoltaic-powered-blower (5), a high-temperature-solar-collectors (6) and a rotating-turbine (4) are pulled by a updraft-tornado-window-chimney (3).

A plurality of a downdraft-tornado-wind-chimney (19) can be constructed so as to enhance the compressed-and-high-velocity-air (15). A plurality of a updraft-tornado-wind-chimney (20) can be constructed so as to enhance the compressed-and-high-velocity-air (15). A photovoltaic-powered-blower (5) extracts the compressed-and-high-velocity-air (15) from a plurality of downdraft-tornado-wind-chimney (19). A photovoltaic-powered-blower (5) injects the compressed-and-high-velocity-air (15) into a plurality of updraft-tornado-wind-chimney (20). A plurality of downdraft-tornado-wind-chimney (19) inject the compressed-and-high-velocity-air into a high-temperature-solar-collectors (6). A high-temperature-solar-collectors (6) inject the compressed-and-high-velocity-air (15) into a plurality of updraft-tornado-wind-chimney (20). A plurality of a downdraft-tornado-wind-chimney (19) inject the compressed-and-high-velocity-air (15) into a rotating-turbine (4). A rotating-turbine (4) inject the compressed-and-high-velocity-air (15) into a plurality of a updraft-tornado-solar-collectors (20). A pipe (22) network joins together a plurality of a downdraft-tornado-wind-chimney (2). A pipe (22) network joins together a plurality of a updraft-tornado-wind-chimney (20).

A description of the figures follows. FIG. 1A shows a external frontal view of a downdraft-tornado-wind-chimney (2). Components comprise of a upper rim (8), a lower rim (9), a horizontal lid (11), a circular-vane-ring (10), and a individual-vanes (12) angled so as to capture the blowing wind (13). A circular-vertical-tube (7) completes a downdraft-tornado-wind-chimney (2). A extraction-valve (14) captures the compressed-and-high-velocity-air (13).

Figure 1B:
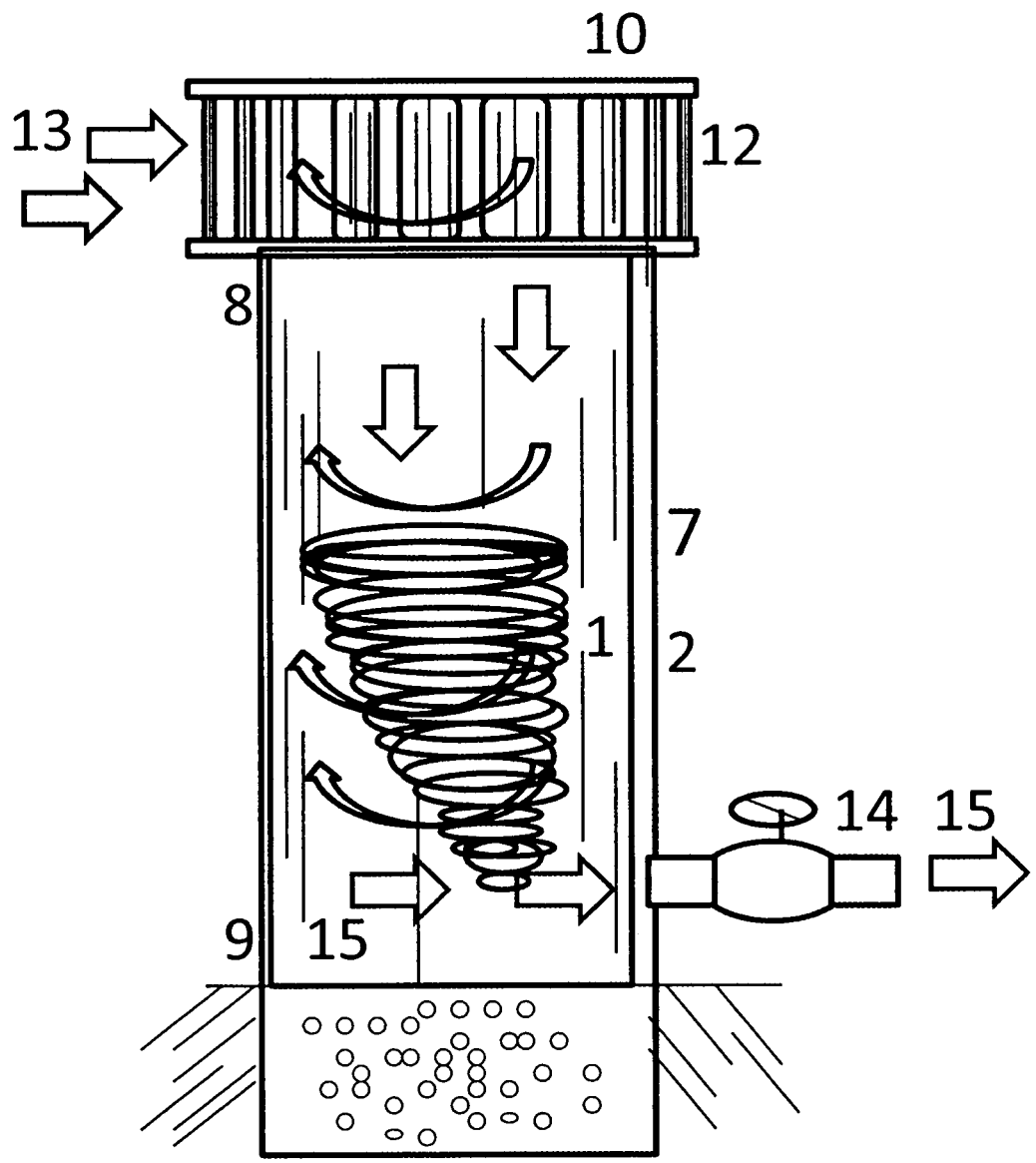
FIG. 1B shows a frontal cross sectional view of a downdraft-tornado-wind-chimney. Shown is a internal functional view.

FIG. 1B shows a frontal internal functional view of a downdraft-tornado-wind-chimney (2). Components comprise of a upper rim (8), a lower rim (9), a circular-vane-ring (10), a tornado (1), and a individual-vanes (12) so angled to capture the blowing wind (13). A circular-vertical-tube (7) completes a downdraft-tornado-wind-chimney (2). A extraction-valve (14) captures the compressed-and-high-velocity-air (15).

Figure 1C:
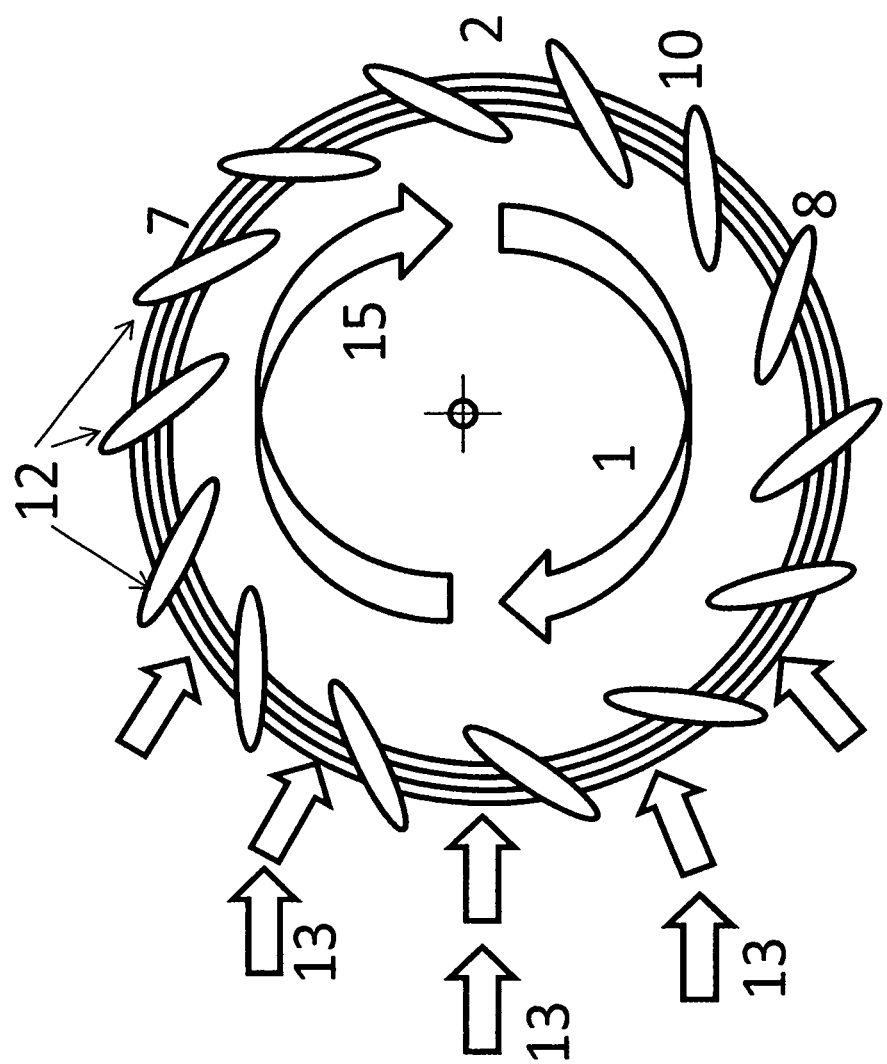
FIG. 1C shows a upper-rim overhead view of a downdraft-tornado-wind-chimney. Shown is a internal functional view.

FIG. 1C shows a overhead internal functional view of a downdraft-tornado-wind-chimney (2). Components comprise of a individual-vanes (12), a circular-vertical-tube (7), a tornado (1), a circular-vane-ring (10), and a upper-rim (8). The blowing-wind (13) creates the compressed-and-high-velocity-air (15).

Figure 1D:
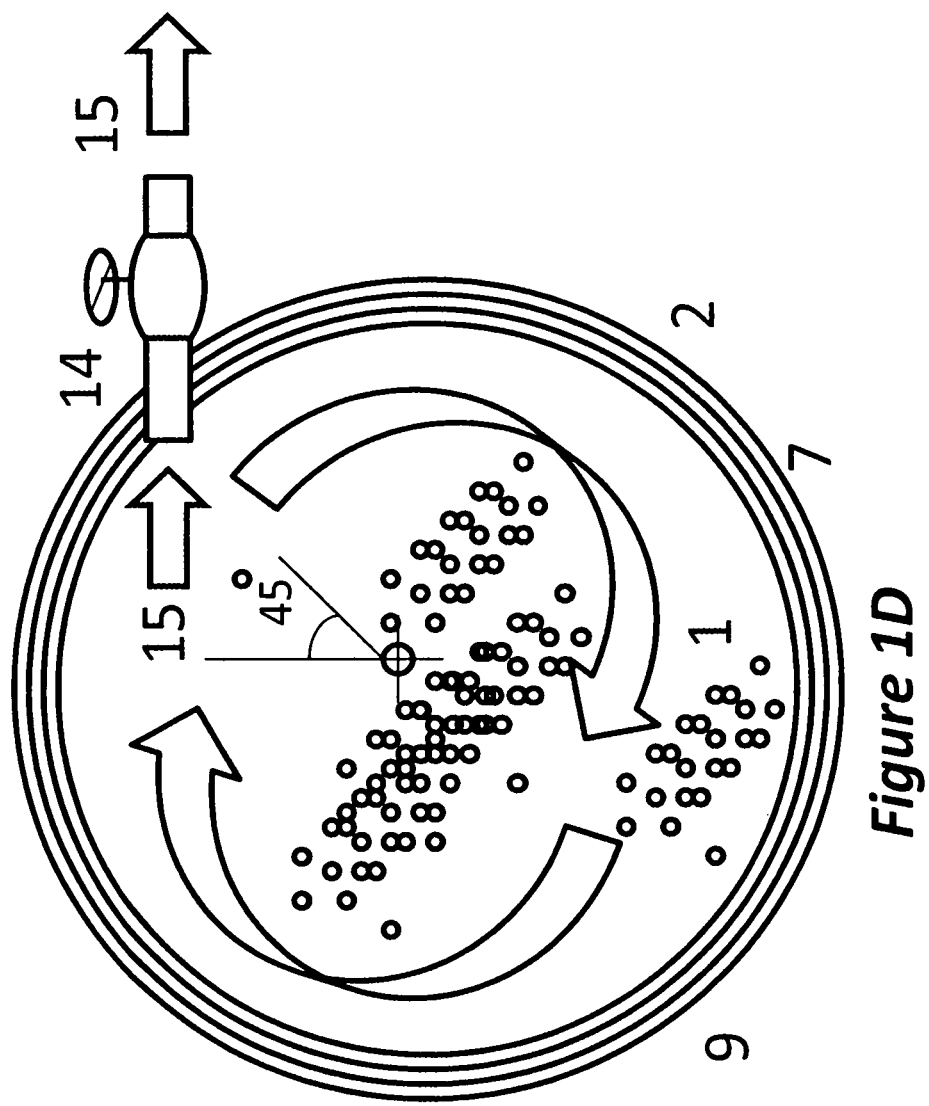
FIG. 1D shows a lower-rim overhead view of a downdraft-tornado-wind-chimney. Shown is a internal functional view.

FIG. 1D shows a overhead internal functional view of a downdraft-tornado-wind-chimney (2). Components comprise of a tornado (1), a lower-rim (9), a circular-vertical-tube (7), and a extraction-valve (14), to create the compressed-and-high velocity-air (15). The extraction-valve (14) is angled 45 degrees from center of a circular-vertical-tube (7) so as to create a tornado (1). FIGS. 1A, 1B, 1C, 1D shows a complete system where the upper-rim (8) of a circular-vertical-tube (7) captures blowing wind (13). A circular-vane-ring (10) is comprised of a individual-vanes (12) angled so as to create a tornado (1). The net result is a tornado (1). A extraction-valve (14) is located 45 degrees from the center of a circular-vertical-tube (7) so as to extract the compressed-and-high-velocity-air (15) of a tornado (1).

Figure 2A:
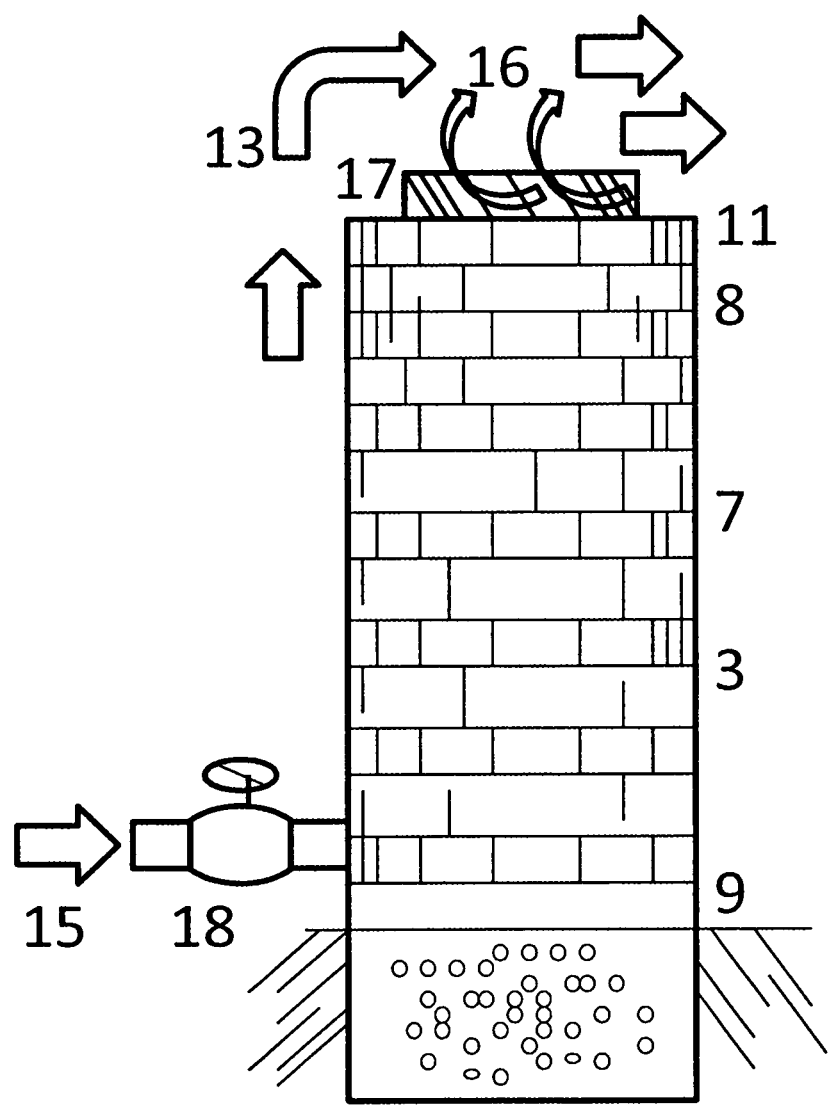
FIG. 2A shows a frontal overview of a updraft-tornado-wind-chimney. Shown is a external view.

FIG. 2A shows a external frontal view of a updraft-tornado-wind-chimney (3). Components comprise of a upper rim (8), a lower rim (9), a horizontal lid (11), a circular-vane-array (16), and a radial-individual-vanes (17) so angled to capture the blowing wind (13). A circular-vertical-tube (7) completes a updraft-tornado-wind-chimney (3). A insertion-valve (18) inserts the compressed-and-high-velocity-air (15).

Figure 2B:
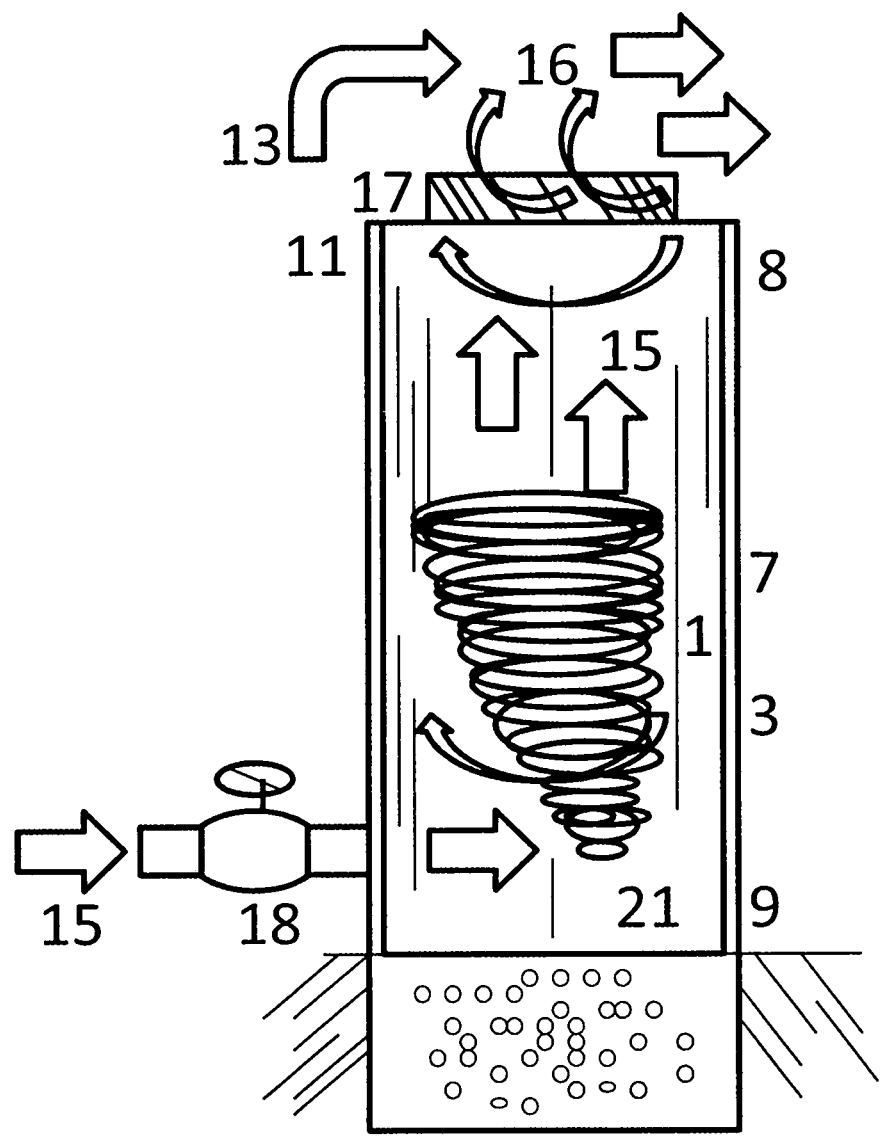
FIG. 2B shows a cross sectional view of a updraft-tornado-wind-chimney. Shown is a internal functional view.

FIG. 2B shows the frontal functional view of a updraft-tornado-wind-chimney (3). Components comprise of a upper rim (8), a lower rim (9), a horizontal lid (11), a circular-vane-array (16), a tornado (1), and a radial-individual-vanes (17) angled so as to capture the blowing wind (13). A circular-vertical-tube (7) completes a updraft-tornado-wind-chimney (3). A insertion-valve (18) inserts the compressed-and-high-velocity-air (15). The expansion of hot air create a vacuum (21).

Figure 2C:
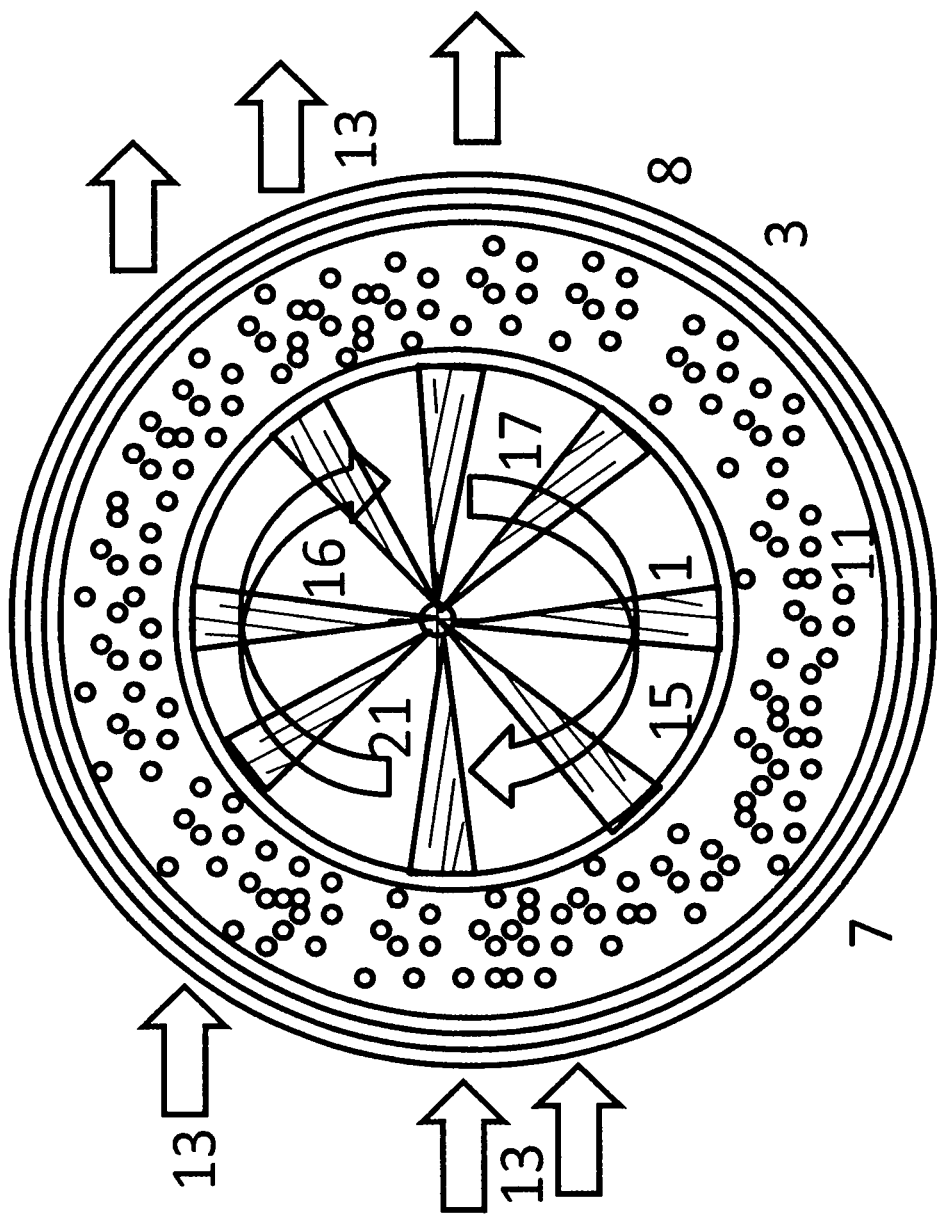
FIG. 2C shows a upper-rim overhead functional view of a updraft -tornado-wind-chimney. Shown is a external view.

FIG. 2C shows a overhead external functional view of a updraft-tornado-wind-chimney (3). Components comprise of a radial-individual-vanes (17), a circular-vertical-tube (7), a tornado (1), a circular-vane-array (16), and a upper-rim (8). The blowing-wind (13) create the compressed-and-high-velocity-air (15). The net result creates a vacuum (21).

FIG. 2D shows a overhead internal functional view of a updraft-tornado-wind-chimney (3). Components comprise of a tornado (1), a lower-rim (9), a circular-vertical-tube (7), and a insertion-valve (18) to create the compressed-and-high velocity-air (15). FIGS. 1A, 1B, 1C, 1D shows a complete system where the compressed-and-high-velocity-air (15) enters a updraft-tornado-wind-chimney (3). The insertion-valve (18) is angled 45 degrees from the center of a circular-vertical-tube (7) so as to create a tornado (1). As the compressed-and-high-velocity-air (15) expands inside the circular-vertical-tube (7), a tornado (1) is created. Hot air rises.

Figure 3:
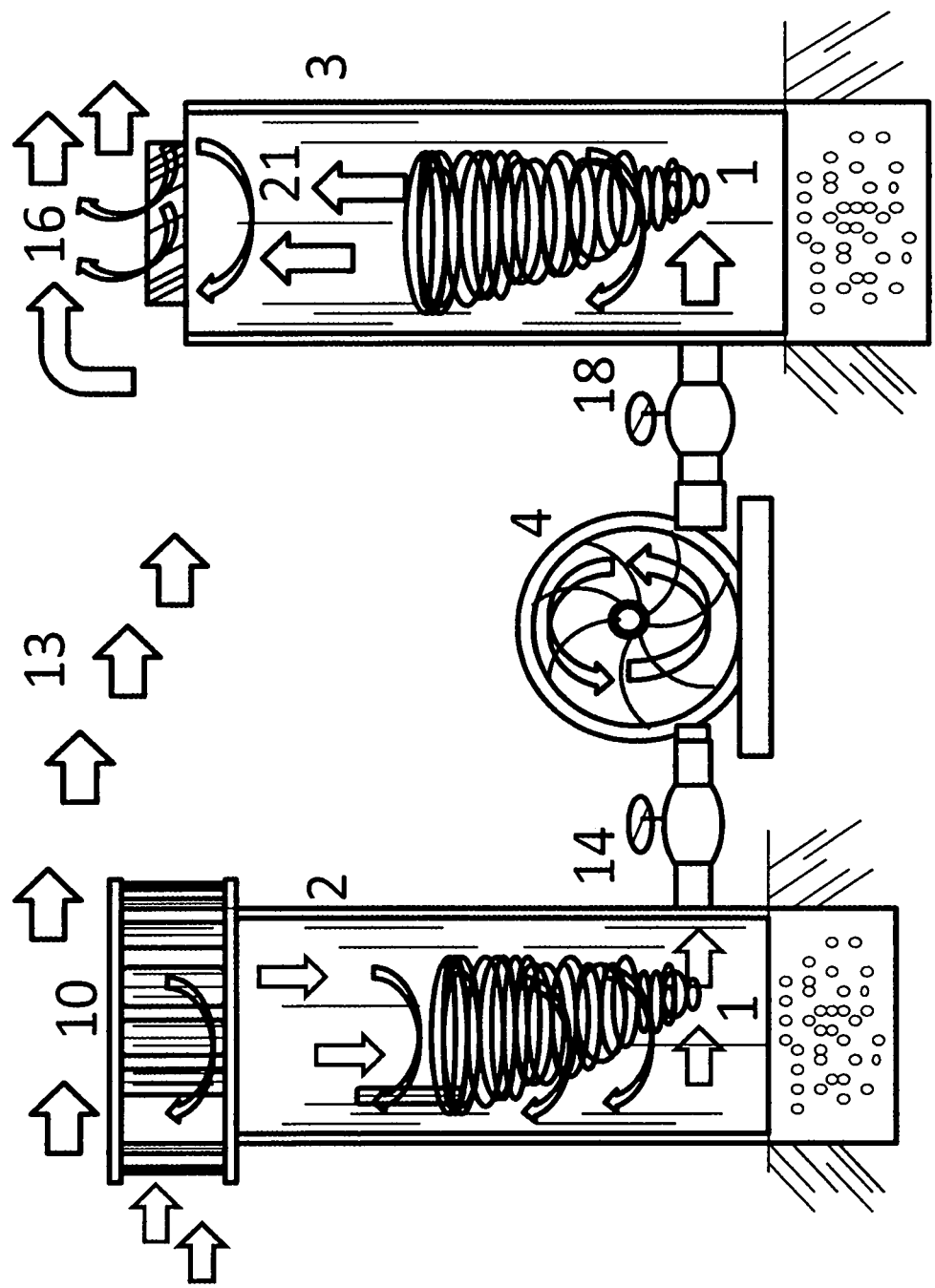
FIG. 3 shows a frontal view of a downdraft-tornado-wind-chimney with a rotating-turbine and a updraft-tornado-wind-chimney. Shown is a internal functional view.

FIG. 3 illustrates a downdraft-tornado-wind-chimney (2) and a updraft-tornado-wind-chimney (3). The updraft-tornado-wind-chimney (3) create a vacuum (21). Shown are the components of a tornado (1), a extraction-valve (14), a insertion-valve (18), a vacuum (21), a circular-vane-ring (10), a rotating-turbine (4) and a circular-vane-array (16). The net result is a downdraft-tornado-wind-chimney (2) and a updraft-tornado-wind-chimney (3) push and pull on a rotating-turbine (4) from the blowing-wind (13).

Figure 4:
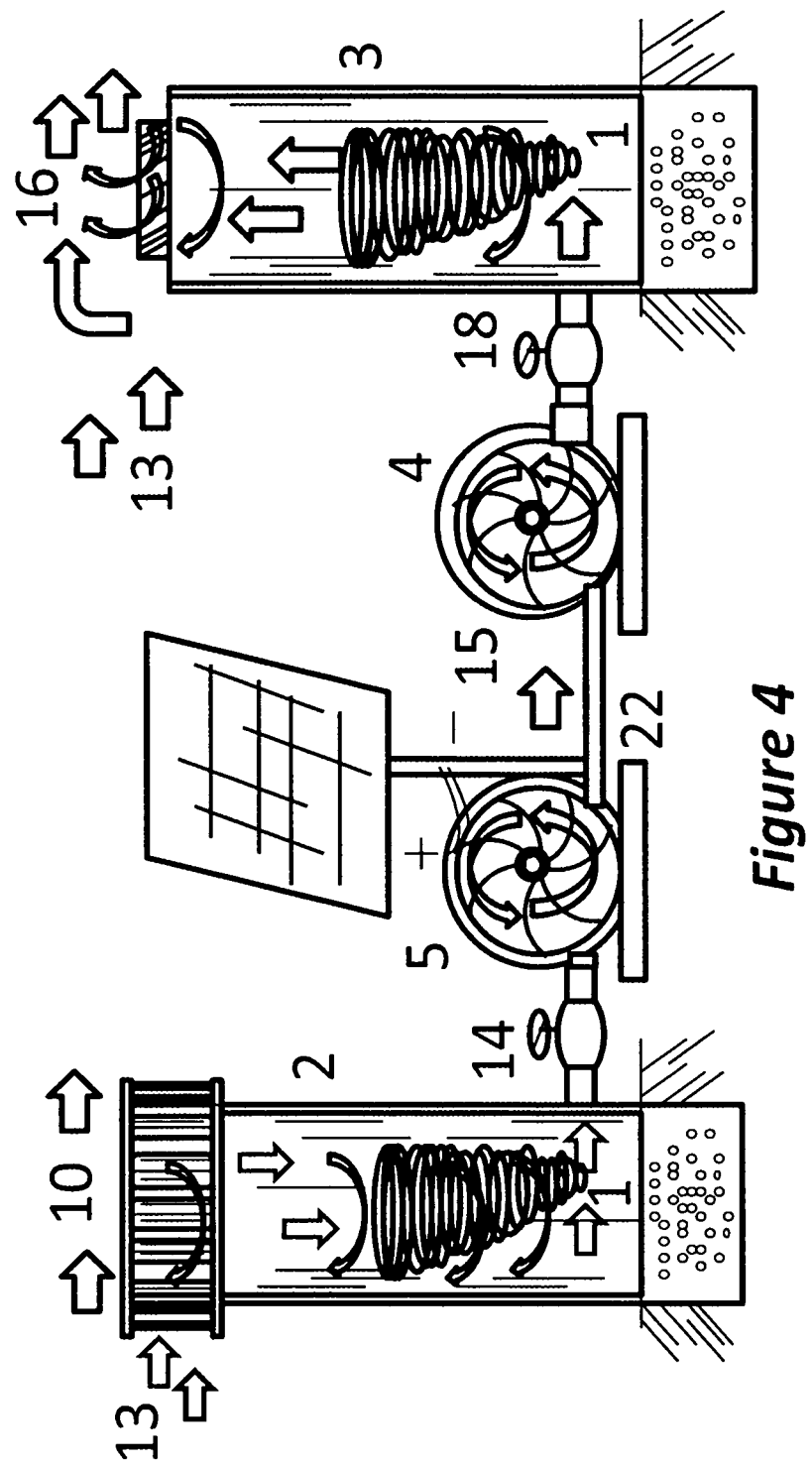
FIG. 4 shows a frontal view of a downdraft-tornado-wind-chimney with a photovoltaic-power-blower, a rotating-turbine and a updraft-tornado-wind-chimney. Shown is a internal functional view.

FIG. 4 illustrates a downdraft-tornado-wind-chimney (2) and a updraft-tornado-wind-chimney (3). A downdraft-tornado-wind-chimney (2) create the compressed-and-high-velocity-air (15) for a rotating-turbine (4). Shown are the components of a tornado (1), a extraction-valve (14), a insertion-valve (18), a circular-vane-ring (10), and a circular-vane-array (16). The net result is a downdraft-tornado-wind-chimney (2) and a updraft-tornado-wind-chimney (3) push and pull on a rotating-turbine (14) from the blowing-wind (13). There is the addition of a photovoltaic-powered-blower (5). The photovoltaic-powered-blower (5) extract the compressed-and-high-velocity-air (15) from the extraction-valve (14) and further compresses the compressed-and-high-velocity-air (15). A pipe (22) network joins a photovoltaic-powered-blower (5) with a rotating-turbine(4). The net result is solar energy adds additional power to a rotating-turbine (4).

Figure 5:
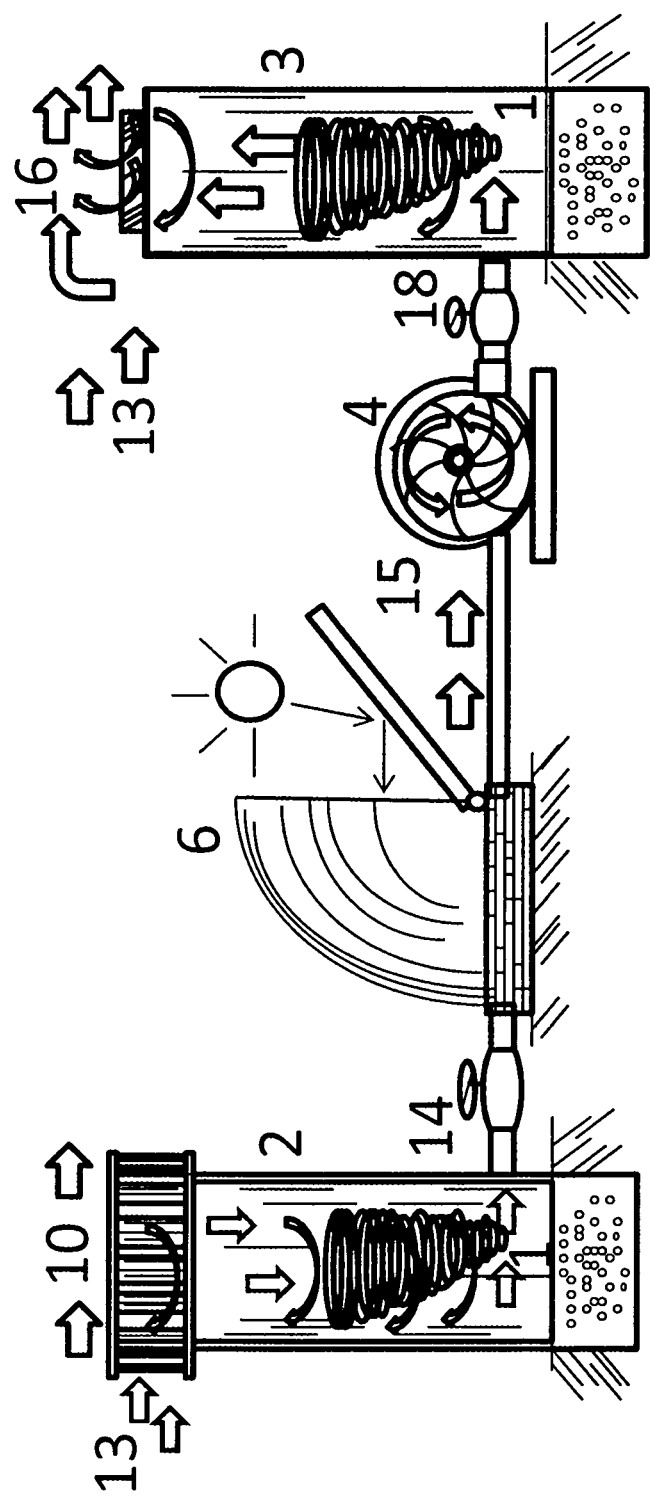
FIG. 5 shows a frontal view of a downdraft-tornado-wind-chimney with a high-temperature-solar-collectors, a rotating-turbine, and a updraft-tornado-wind-chimney. Shown is a internal functional view.

FIG. 5 illustrates a downdraft-tornado-wind-chimney (2) and a updraft-tornado-wind-chimney (3). A downdraft-tornado-wind-chimney (2) create the compressed-and-high-velocity-air (15) for a high-temperature-solar-collectors (6). Shown are the components of a tornado (1), a extraction-valve (14), a insertion-valve (18), a circular-vane-ring (10), and a circular-vane-array (16). The net result is a downdraft-tornado-wind-chimney (2) and a updraft-tornado-wind-chimney (3) push and pull on a rotating-turbine (4) from the blowing-wind (13). There is the addition of a high-temperature-solar-collectors (6). A high-temperature-solar-collectors (6) extract compressed-and-high-velocity-air (15) from a extraction-valve (14) and further compresses the compressed-and-high-velocity-air (15). The net result is solar energy adds additional power to a rotating-turbine (4).

Figure 6:
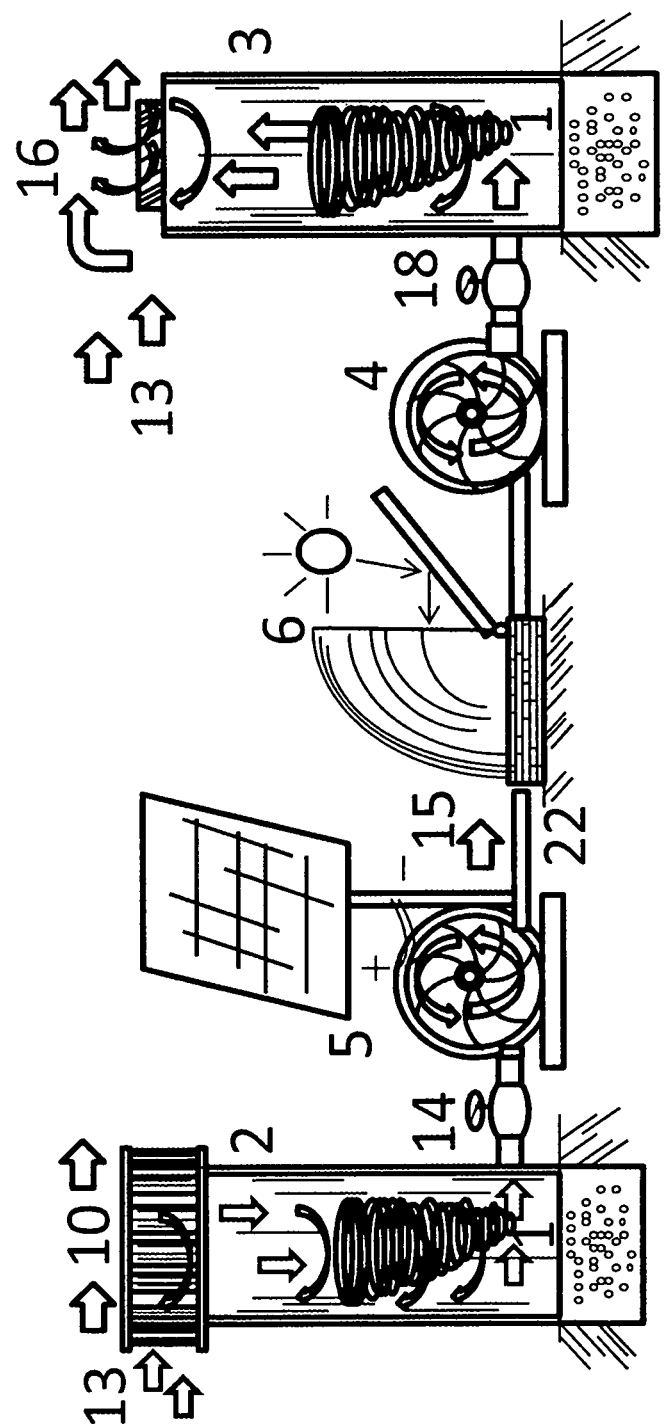
FIG. 6 shows a frontal view of a downdraft-tornado-wind-chimney with a photovoltaic-power-blower, a high-temperature-solar-collectors, a rotating-turbine and a updraft-tornado-wind-chimney. Shown is a internal functional view.

FIG. 6 illustrates a downdraft-tornado-wind-chimney (2) and a updraft-tornado-wind-chimney (3). A downdraft-tornado-wind-chimney (2) create the compressed-and-high-velocity-air (15) for a high-temperature-solar-collectors (6) and a photovoltaic-powered-blower (5). Shown are the components of a tornado (1), a extraction-valve (14), a insertion-valve (18), a circular-vane-ring (10) and a circular-vane-array (16). The net result is a downdraft-tornado-wind-chimney (2) and a updraft-tornado-wind-chimney (3) push and pull on a rotating-turbine (4) from the blowing-wind (13). There is the addition of a high-temperature-solar-collectors (6) and a photovoltaic-powered-blower (5). A high-temperature-solar-collectors (6) and a photovoltaic-powered-blower (5) extract the compressed-and-high-velocity-air (15) further compressing the compressed-and-high-velocity-air (15). A pipe (22) network join a photovoltaic-powered-blower (5), a high-temperature-solar-collectors (6), and a rotating-turbine (4). The net result is solar energy adds additional power to a rotating-turbine (4) from the blowing-wind (13).

Figure 7A:
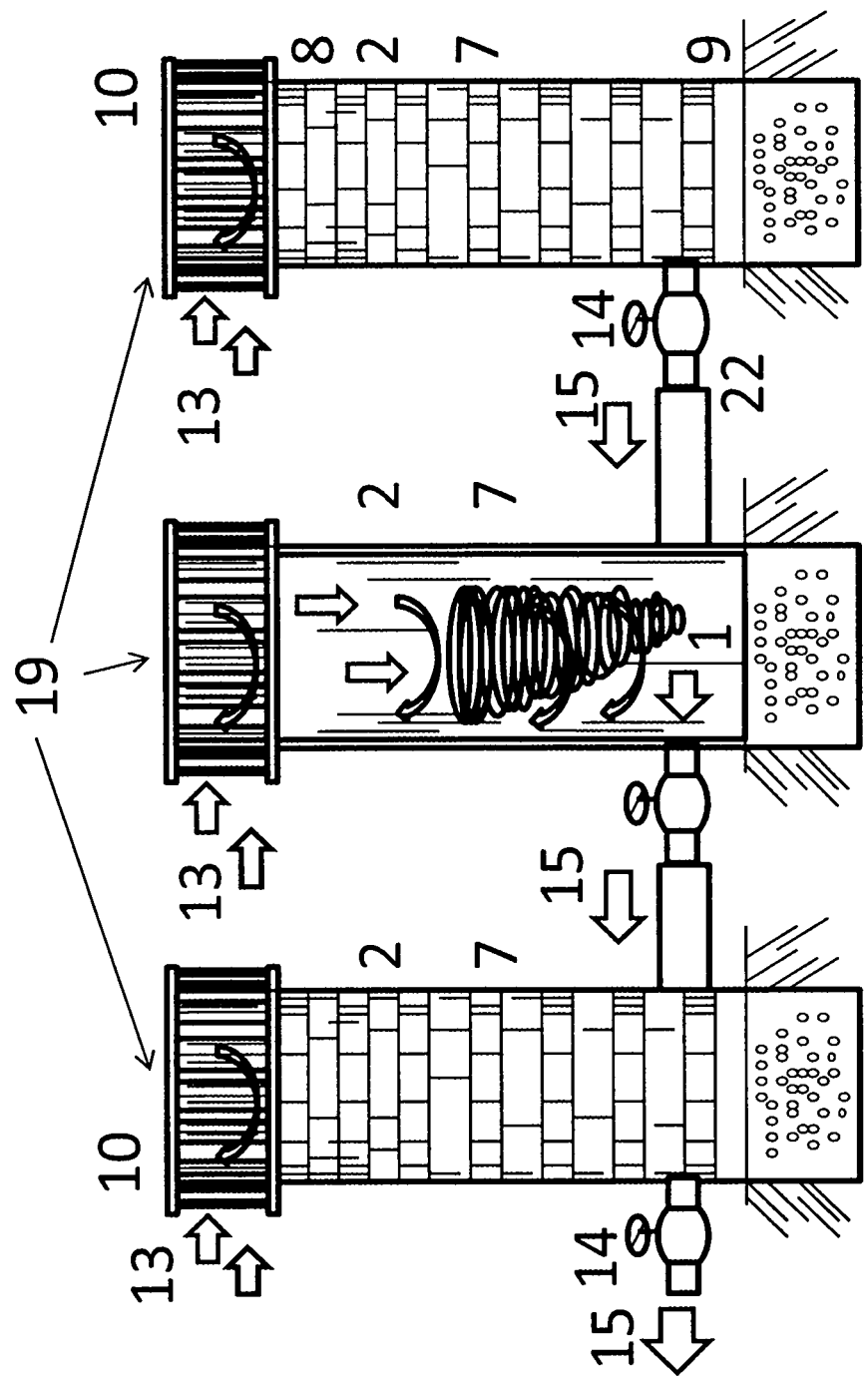
FIG. 7A shows a frontal view of a plurality of a downdraft-tornado-wind-chimney. Shown is a external and internal functional view.

FIG. 7A shows a frontal functional external and internal view of a plurality of a downdraft-tornado-wind-chimney (19). Shown is a circular-vane-ring (10), a upper-rim (8), a lower-rim (9), a circular-vertical-tube (7), a tornado (1), and a extraction-valve (14). The net result is to create the compressed-and-high-velocity-air (15). The plurality of a downdraft-tornado-wind-chimney (19) are joined by a pipe (22) network.

Figure 7B:
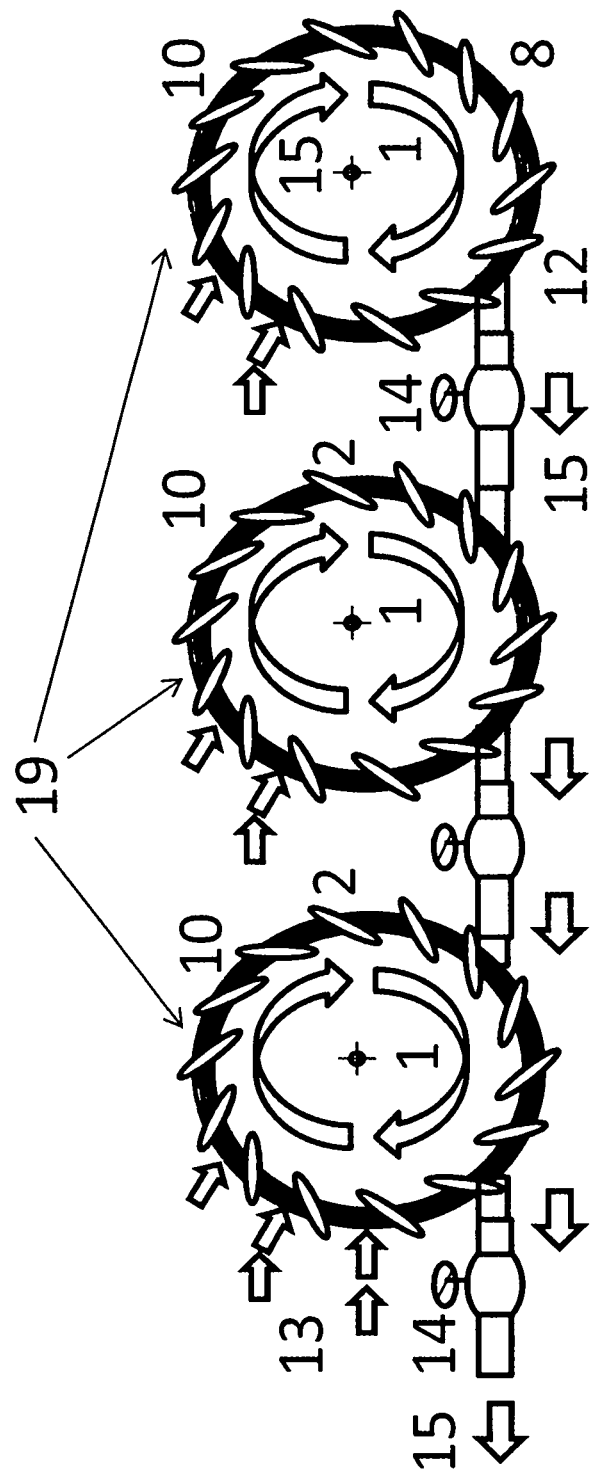
FIG. 7B shows a overhead view of a plurality of a downdraft-tornado-wind-chimney. Shown is a internal functional view.

FIG. 7B shows a overhead functional internal view of a plurality of a downdraft-tornado-wind-chimney (19). Shown is a circular-vane-ring (10), a individual-vanes (12), a upper-rim (8), a tornado (1), and a extraction-valve (14). The net result is to create the compressed-and-high-velocity-air (15).

FIG. 8A shows a frontal functional internal and external view of a plurality of a updraft-tornado-wind-chimney (2). Shown is a circular-vane-array (16), a tornado (1), and a insertion-valve (18). The net result is to create the compressed-and-high-velocity air (15) from the blowing-wind (13). A plurality of a downdraft-tornado-wind-chimney (20) are join by a pipe (22) network.

Figure 8B:
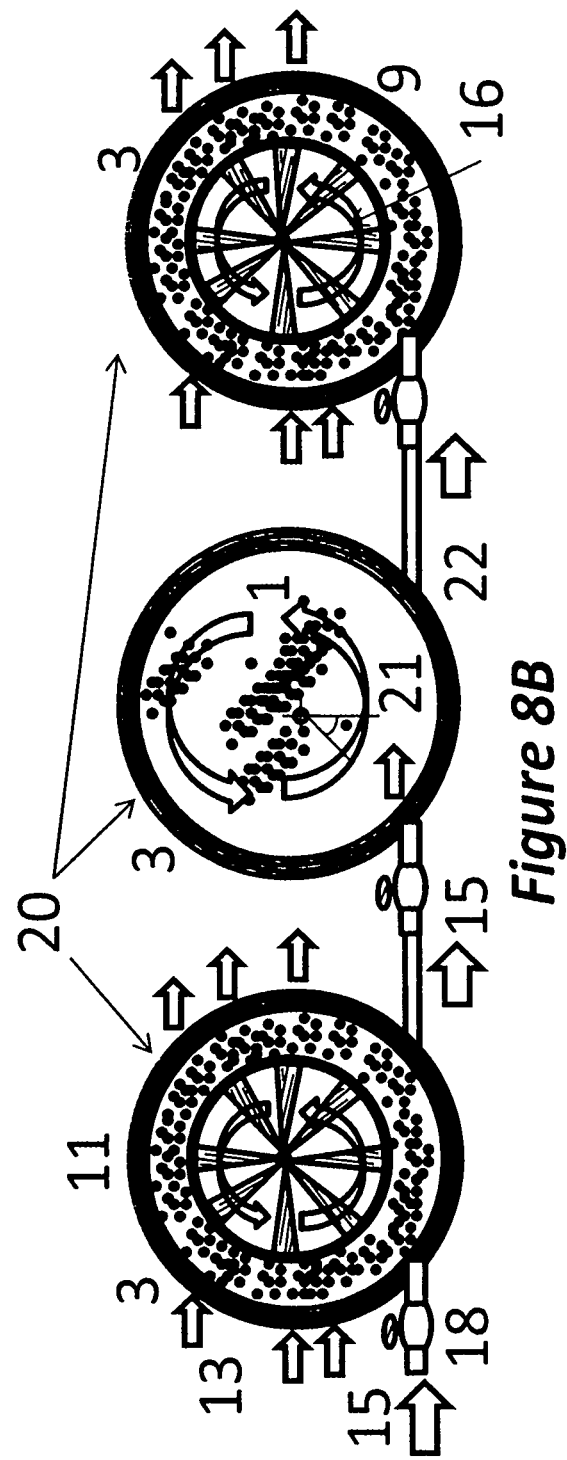
FIG. 8B shows a overhead view of a plurality of a updraft-tornado-wind-chimney. Shown is a internal functional view.

FIG. 8B shows a overhead functional internal and external view of a plurality of a updraft-tornado-wind-chimney (20). Shown is a circular-vane-array (16), a horizontal-lid (11), a lower-rim (9), a tornado (1), and a insertion-valve (18). A plurality of a updraft-tornado-wind-chimney (20) is joined by a pipe (22) network. The net result is the compressed-and-high-velocity-air (15). The net result is a vacuum (21).

Figure 9:
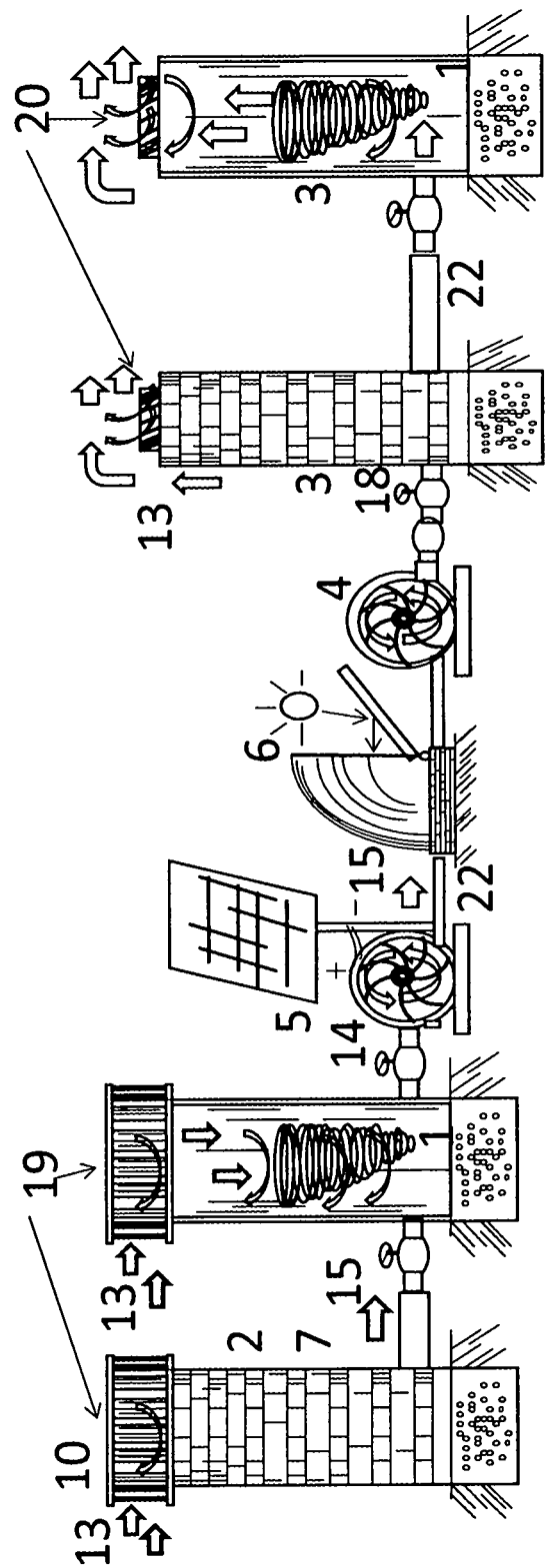
FIG. 9 shows a frontal view of a plurality of a downdraft-tornado-wind-chimney, a photovoltaic-powered-blower, a high-temperature-solar-collectors, a rotating-turbine, and a plurality of a updraft-tornado-wind-chimney. Shown is a external and internal functional view.

FIG. 9 shows a frontal internal and external functional overview of the entire system of a plurality of a downdraft-tornado-wind-chimney (19) combined with a plurality of a updraft-tornado-wind-chimney (20). A plurality of a downdraft-tornado-wind-chimney (19) and a plurality of a updraft-tornado-wind-chimney (20) create the compressed-and-high-velocity-air (15) from the blowing-wind (13). The net result is compressed-and-high-velocity-air (15) is created for a photovoltaic-powered-blower (5), a high-temperature-solar-collectors (6) and a rotating-turbine (4). Shown is a tornado (1), extraction-valve (14), a insertion-valve (18), a downdraft-tornado-wind-chimney (2), a updraft-tornado-wind-chimney (3), a circular-vertical-tube (7), and a pipe (22) network.

The invention claimed is:

1. A downdraft-tornado-wind-chimney;
said tornado-wind-chimney comprised of a circular-vertical-tube;
said circular-vertical-tube comprised of an upper-rim;
the circular-vertical-tube comprised of a lower-rim;
adjacent and attached and vertical to the upper-rim a circular-vane-ring;
a horizontal-lid adjacent, perpendicular and attached to said circular-vane-ring;
said horizontal-lid encapsulating the downdraft-tornado-wind-chimney;
the horizontal-lid encapsulating the circular-vertical-tube;
the circular-vane-ring comprised of an individual-vanes;
the horizontal-lid adjacent, perpendicular and attached to said individual-vanes;
the individual-vanes angled so as to capture a blowing-wind;
the individual-vanes angled so as to create a tornado;
said tornado centrally located to the circular-vane-ring;
the tornado centrally located to the circular-vertical-ring;
the horizontal-lid encapsulating the tornado;
the tornado capturing said blowing-wind;
the tornado forcing the blowing-wind from said upper-rim to said lower-rim;
an extraction-valve located adjacent, perpendicular and attached to the circular-vertical-tube;
said extraction-valve off set 45 degrees from the center of the circular-vertical-tube;
the extraction-valve located adjacent, perpendicular and adjacent to the lower-rim;
the extraction-valve angled so as to extract the blowing-wind from the tornado;
the extraction-valve regulating the amount of the blowing-wind;
the extraction-valve creating a compressed-and-high-velocity-air;
the circular-vertical-tube creating said compressed-and-high-velocity-air;
the circular-vane-ring creating the compressed-and-high-velocity-air;
the individual-vanes creating the compressed-and-high-velocity-air;
the downdraft-tornado-wind-chimney comprised of the circular-vertical-tube, the circular-vane-ring, the individual-vanes, the horizontal-lid, the extraction-valve, and the tornado;
the downdraft-tornado-wind-chimney creating the compressed-and-high-velocity-air from the blowing-wind.

2. An updraft-tornado-wind-chimney;
said updraft-tornado-wind-chimney comprised of a circular-vertical-tube:
said circular-vertical-tube comprised of an upper-rim;
the circular-vertical-tube comprised of a lower-rim;
a horizontal-lid adjacent, perpendicular and attached to the circular-vertical-tube;
said horizontal-lid adjacent, perpendicular and attached to said upper-rim;
a circular-vane-array adjacent, horizontal and attached to the horizontal-lid;
said circular-vane-array centrally located to the horizontal-lid;
the circular-vane-array containing a radial-individual-vanes;
the horizontal-lid, the vertical-circular-tube; the circular-vane-array; and said radial-individual-vanes encapsulating a tornado;
the horizontal-lid creating said tornado;
the circular-vertical-tube creating said tornado;
the circular-vane-array creating the tornado;
the radial-individual-vanes angled so as to create the tornado;
an insertion-valve located adjacent, perpendicular and attached to said lower-rim;
said insertion-valve offset by 45 degrees from the center of the circular-vertical-tube;
the insertion-valve injecting a compressed-and-high-velocity-air;
the insertion-valve injecting said compressed-and-high-velocity air to the circular-vertical-tube;
the insertion-valve injecting the compressed-and-high-velocity-air to the circular-vane-array;
the insertion-valve injecting the compressed-and-high-velocity-air to the radial-individual-vanes;
the insertion-valve angled so as to create the tornado;
the upward movement of the compressed-and-high-velocity-air creating a vacuum;
the blowing-wind across the upper-rim of the updraft-tornado-wind-chimney creating said vacuum;
the blowing-wind across the circular-vane-array creating a vacuum;
the updraft-wind-chimney creating a vacuum;
the updraft-wind-chimney comprised of the vertical-circular-tube, the horizontal-lid, the insertion-valve, the circular-vane-array, the radial-individual-vanes, and the tornado.

3. A downdraft-tornado-wind-chimney and an updraft-tornado-wind-chimney assembly;
said downdraft-tornado-wind-chimney creating a compressed-and-high-velocity-air;
said updraft-tornado-wind-chimney creating a vacuum from said compressed-and-high-velocity-air;
the downdraft-tornado-wind-chimney injecting the compressed-and-high-velocity-air into a photovoltaic-powered-blower;
the downdraft-tornado-wind-chimney injecting the compressed-and-high-velocity-air into a high-temperature-solar-collectors;
the downdraft-tornado-wind-chimney injecting the compressed-and-high-velocity-air into a rotating-turbine;

the downdraft-tornado-wind-chimney injecting the compressed-and-high-velocity-air into the updraft-tornado-wind-chimney;

the updraft-tornado-wind-chimney extracting the compressed-and-high-velocity-air from the downdraft-tornado-wind-chimney;

the updraft-tornado-wind-chimney extracting the compressed-and-high-velocity-air from said photovoltaic-powered-blower;

the updraft-tornado-wind-chimney extracting the compressed-and-high-velocity air from said high-temperature-solar-collectors;

the updraft-tornado-wind-chimney extracting the compressed-and-high-velocity-air from said rotating-turbine;

the photovoltaic-powered-blower extracting the compressed-and-high-velocity-air from the downdraft-tornado-wind-chimney;

the photovoltaic-blower injecting the compressed-and-high-velocity-air into the high-temperature-solar-collectors;

the photovoltaic-blower injecting the compressed-and-high-velocity-air into the rotating-turbine;

the photovoltaic-power-blower injecting the compressed-and-high-velocity-air into the updraft-tornado-wind-chimney;

the high-temperature-solar-collectors extracting the compressed-and-high-velocity-air from the downdraft-tornado-wind-chimney;

the high-temperature-solar-collectors extracting the compressed-and-high-velocity-air from the photovoltaic-powered-blower;

the high-temperature-solar-collectors injecting the compressed-high-velocity-air into the rotating-turbine;

the high-temperature-solar-collectors injecting the compressed-and-high-velocity-air into the updraft-tornado-wind-chimney;

the rotating-turbine extracting the compressed-and-high-velocity-air from the downdraft-tornado-wind-chimney;

the rotating-turbine extracting the compressed-and-high-velocity-air from the photovoltaic-powered-blower;

the rotating-turbine extracting the compressed-and-high-velocity-air from the high-temperature-solar-collectors;

the rotating-turbine injecting the compressed-and-high-velocity-air into the updraft-tornado-wind-chimney;

the downdraft-tornado-wind-chimney and the updraft-tornado-wind-chimney assembly comprised of the photovoltaic-powered-blower, the high-temperature-solar-collectors, and the rotating-turbine.

4. The downdraft-tornado-wind-chimney of claim 1 being a plurality of said downdraft-tornado-wind-chimney.

5. The updraft-tornado-wind-chimney of claim 2 being a plurality of said updraft-tornado-wind-chimney.

* * * * *